United States Patent
Cambou et al.

(10) Patent No.: US 11,625,478 B2
(45) Date of Patent: Apr. 11, 2023

(54) RESILIENT PASSWORD MANAGEMENT SYSTEM USING AN ARRAY OF ADDRESSABLE PHYSICAL UNCLONABLE FUNCTIONS

(71) Applicant: Arizona Board of Regents on Behalf of Northern Arizona University, Flagstaff, AZ (US)

(72) Inventors: Bertrand F Cambou, Flagstaff, AZ (US); Mohammad Mohammadinodoushan, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 20 days.

(21) Appl. No.: 17/231,914

(22) Filed: Apr. 15, 2021

(65) Prior Publication Data
US 2022/0067140 A1 Mar. 3, 2022

Related U.S. Application Data

(60) Provisional application No. 63/010,413, filed on Apr. 15, 2020.

(51) Int. Cl.
*G06F 21/46* (2013.01)
*H04L 9/32* (2006.01)

(52) U.S. Cl.
CPC ............ *G06F 21/46* (2013.01); *H04L 9/3278* (2013.01)

(58) Field of Classification Search
CPC ....... G06F 21/46; G06F 21/45; H04L 9/3278; H04L 9/3226
See application file for complete search history.

(56) References Cited

U.S. PATENT DOCUMENTS 8,694,778 B2 4/2014 Teuwen et al.
8,868,923 B1 * 10/2014 Hamlet .................. G06F 21/00
326/8

(Continued)

FOREIGN PATENT DOCUMENTS

JP 2016018257 A * 2/2016
WO WO-2013107593 A1 * 7/2013 ............. G06F 21/44

(Continued)

OTHER PUBLICATIONS

Alaca, Furkan. Strengthening Password-Based Web Authentication through Multiple Supplementary Mechanisms. Diss. Carleton University, 2018. (Year: 2018).*

(Continued)

*Primary Examiner* — Michael Simitoski
(74) *Attorney, Agent, or Firm* — Quarles & Brady LLP

(57) ABSTRACT

Systems and methods for improving security in computer-based authentication systems by using physical unclonable functions are presented. A computing device used to provide authentication includes multiple arrays of physical unclonable function devices. Rather than storing user passwords or message digests of passwords, the computing device generates a message digest based on a user's credentials. A challenge response generated by measuring physical parameters of set of physical unclonable function devices specified by the message digest. The computing device can provide authentication without storing information which could be used by an attacker to compromise user credentials. Redundancy and robustness to varying loads are provided by the use of multiple PUF arrays which may be used as backups or to provide load balancing. Backdoor access may be provided to trusted parties without exposing user credentials.

12 Claims, 21 Drawing Sheets

(56) References Cited

U.S. PATENT DOCUMENTS

| | | | |
|---|---|---|---|
| 10,454,691 B2 | 10/2019 | Cambou | |
| 10,803,942 B1* | 10/2020 | Jung | H04L 9/3278 |
| 2010/0325707 A1 | 12/2010 | Iverson et al. | |
| 2015/0058928 A1* | 2/2015 | Guo | H04L 63/0876 726/30 |
| 2018/0129801 A1* | 5/2018 | Cambou | G06F 21/44 |
| 2018/0129802 A1* | 5/2018 | Cambou | H04L 9/0643 |
| 2018/0131529 A1 | 5/2018 | Cambou | |
| 2019/0342106 A1* | 11/2019 | Li | G11C 7/24 |
| 2019/0354672 A1* | 11/2019 | Cambou | G06F 21/45 |
| 2020/0280551 A1* | 9/2020 | Wallrabenstein | H04L 63/0428 |

FOREIGN PATENT DOCUMENTS

| | | | | |
|---|---|---|---|---|
| WO | WO-2018183866 A1 * | 10/2018 | | G06F 21/73 |
| WO | WO-2018183915 A1 * | 10/2018 | | G06F 21/602 |
| WO | WO-2018183926 A1 * | 10/2018 | | G06F 21/44 |
| WO | WO-2021028574 A1 * | 2/2021 | | H04L 9/3278 |

OTHER PUBLICATIONS

Frikken, Keith B., Marina Blanton, and Mikhail J. Atallah. "Robust authentication using physically unclonable functions." International Conference on Information Security. Springer, Berlin, Heidelberg, 2009. (Year: 2009).*

Kwon, Byoung-Wook, Pradip Kumar Sharma, and Jong-Hyuk Park. "CCTV-based multi-factor authentication system." Journal of Information Processing Systems 15.4 (2019): 904-919. (Year: 2019).*

Cambou, B., "Password Manager Combining Hashing Functions and Ternary PUFs," in Intelligent Computing-Proceedings of the Computing Conference, Springer, pp. 494-513, 2019.

Mohammadinodoushan, M. et al., "Implementation of Password Management System Using Ternary Addressable PUF Generator," 2019 16th Annual IEEE International Conference on Sensing, Communication, and Networking (SECON), IEEE, pp. 1-8, 2019.

Shamsoshoara, A., "Ring Oscillator and Its Application as Physical Unclonable Function (PUF) for Password Management," arXiv preprint arXiv:1901.06733, 2019.

Cambou, B., "Addressable PUF generators for database-free password management system," CryptArchi, 2018.

Rostami, M et al., "Robust and Reverse-engineering Resilient PUF Authentication and Key-exchange by Substring Matching," IEEE Transactions on Emerging Topics in Computing, vol. 2, No. 1, pp. 37-49, 2014.

* cited by examiner

FIG. 3

| Step | Description of the instruction | Data stream/information | Where |
|---|---|---|---|
| 1.0 | Hashing of the password $PW_j$ | $h(PW_j)$ | Server |
| 2.0 | Convert the hash message digest $h(PW_j)$ into the address XY | $H(PW_j) \rightarrow X\,Y$ | APG |
| 3.0 | Extract the challenge – n-bits located pass the address XY | {n-bits challenge} | APG |
| 3.1 | Measure parameter $\mathcal{P}$ for the n-cells | $\{P_1, P_2, ..., P_n\}$ | APG |
| 3.2 | Generate data stream $Ch_j \in \{0, 1\}$, the challenge | $Ch_j = \{C_1, C_2, ..., C_n\}$ | APG |
| 4.0 | XORing the user ID $User_j$ with the password $PW_j$ | $User_j \oplus PW_j$ | Server |
| 5.0 | Convert the message digest $h(User_j \oplus PW_j)$ into the address $Add_i$ | $H(User_j \oplus PW_j) \rightarrow Add_i$ | Server |
| 6.0 | Store the challenges $Ch_j$ in the database at the address $Add_i$ | $Add_i$ ; $Ch_j$ | Database |

*FIG. 8*

| Step | Description of the instruction | Data stream/information | Where |
|---|---|---|---|
| 1.0 | Hashing of the password $PW_j$ | $h(PW_j)$ | Server |
| 2.0 | Convert the hash message digest $h(PW_j)$ into the address $XY$ | $H(PW_j) \rightarrow XY$ | APG |
| 3.0 | Extract the Responses – n-bits located pass the address $XY$ | {n-bits Responses} | APG |
| 3.1 | Measure parameter $P$ for the n-cells | $\{P_1, P_2, ..., P_n\}$ | APG |
| 3.2 | Generate data stream $Re_j \in \{0, 1\}$, the challenge | $Re_j = \{R_1, R_2, ..., R_n\}$ | APG |
| 4.0 | XORing the user ID $User_j$ with the password $PW_j$ | $User_j \oplus PW_j$ | Server |
| 5.0 | Convert the message digest $h(User_j \oplus PW_j)$ into the address $Add_i$ | $H(User_j \oplus PW_j) \rightarrow Add_i$ | Server |
| 6.0 | Read the challenges $Ch_j$ in the database at the address $Add_i$ | $Add_i$ ; $Ch_j$ | Database |
| 7.0 | Hamming distance $H_j$ between $Ch_j$ and $Re_j$ | $H_j$ number of "1"s $Ch_j \oplus Re_j$ | Server |
| 8.0 | Authentication if $H_j$ below the threshold | Yes or No | Server |

*FIG. 9*

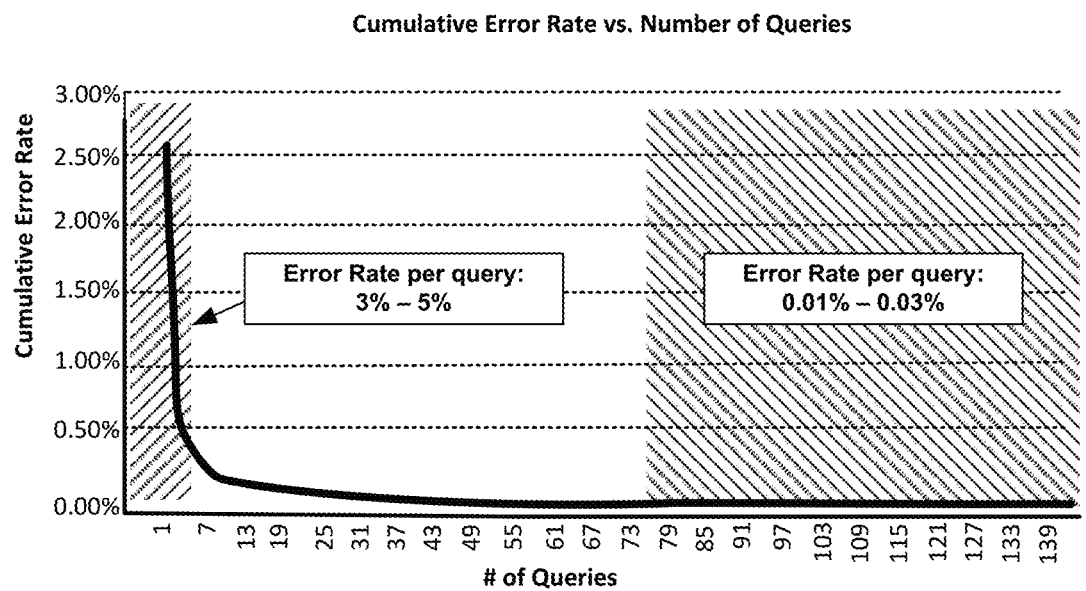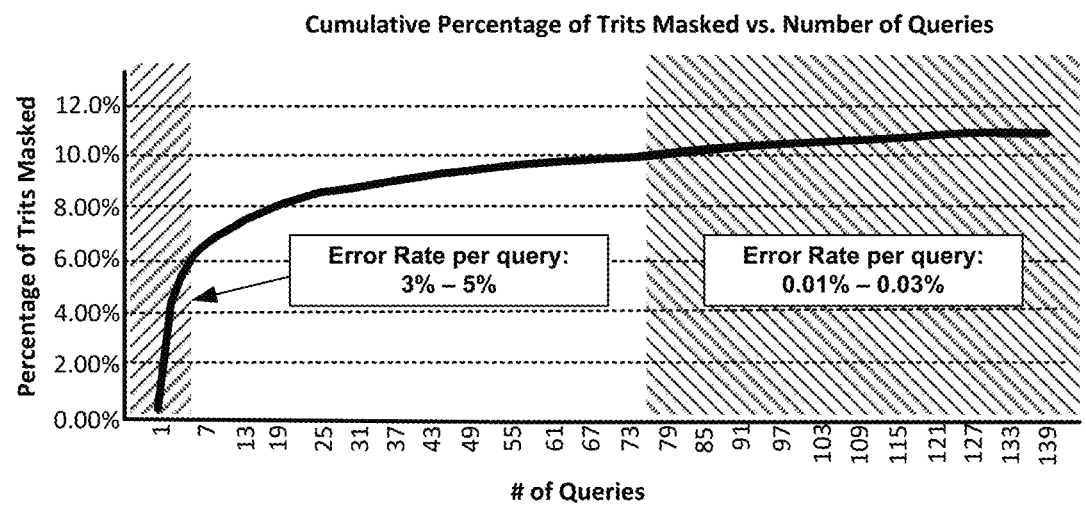
FIG. 10

| | | |
|---|---|---|
| 1 | UserA enters User IDA and Password A (PWA) | Client |
| 2 | A router directs IDA and PWA to Node1 and Node8 | Router |
| 3 | Hashing of PWA in Node1 | Node1 |
| 4 | Hashing of PWA in Node8 | Node1 |
| 5 | h(PWA) converted into address X1Y1 in Node1 | Node1 |
| 7 | Select n cells in the array located at address X1Y1 in Node1 | Node1, Node8 |
| 9 | Measure P for the n-cells | Node1, Node8 |
| 11 | Generate challenge 1A | Node1 |
| 12 | Generate challenge 8A | Node8 |
| 13 | Hashing of (IDA) | Node1, Node8 |
| 14 | h(IDA) converted to X2Y2 in node1 | Node1, Node8 |
| 15 | Select n cells in the array located at address X2Y2 | Node1, Node8 |
| 17 | Measure P for the n-cells | Node1, Node8 |
| 18 | Challenge 1A is saved in the CddA at address X2Y2 | Node1 |
| 19 | Challenge 1A is saved in the CddA at address X2Y2 | Node8 |

*FIG. 17*

| | | |
|---|---|---|
| 1 | User A enters User IDA and Password A (PWA) | Client |
| 2 | A router directs IDA, PWA to the primary responsible node for User A (Node1) | Router |
| 3 | Hashing of PWA | Node1 |
| 4 | h(PWA) converted into address X1Y1 | Node1 |
| 5 | Select n cells in the array located at address X1Y1 | Node1 |
| 6 | Measure P for the n-cells | Node1 |
| 7 | Generate Response 1A | Node1 |
| 8 | Hashing of (IDA) | Node1 |
| 9 | h(IDA) converted to X2Y2 | Node1 |
| 10 | Select n cells in the array located at address X2Y2 | Node1 |
| 9 | h(IDA) converted to cddA | Node1 |
| 10 | Read Challenge 1A in AddA | Node1 |
| 11 | Compare Challenge 1A and response 1A | Node1 |

| | | |
|---|---|---|
| 1 | UserA enters User IDA and Password A (PWA) | Client |
| 2 | Router directs IDA and PWA to backup Node (Node8) | Router |
| 3 | Hashing of PWA | Node8 |
| 4 | h(PWA) converted into address X1Y1 in Node8 | Node8 |
| 5 | Select n cells in the array located at address X1Y1 | Node8 |
| 6 | Measure P for the n-cells | Node8 |
| 7 | Generate Response 8A | Node8 |
| 8 | hashing of (IDA) | Node8 |
| 9 | h(IDA) converted to CddA | Node8 |
| 10 | Read Challenge 8A in CddA | Node8 |
| 11 | Compare Challenge 8A and Response 8A | Node8 |

*FIG. 19*

RESILIENT PASSWORD MANAGEMENT SYSTEM USING AN ARRAY OF ADDRESSABLE PHYSICAL UNCLONABLE FUNCTIONS

CROSS-REFERENCE TO RELATED APPLICATIONS

The present application claims priority to U.S. Provisional Application 63/010,413 entitled "Resilient Password Management System Using an Array of Addressable Physical Unclonable Functions" and filed on Apr. 15, 2020, the disclosure of which is incorporated herein by reference.

STATEMENT CONCERNING FEDERALLY-FUNDED RESEARCH

This invention was made with the support of the Government under Grant/Contract No. SFP1143600 awarded by the United States Air Force Research Laboratory. The government may have certain rights in the invention.

BACKGROUND OF THE INVENTION

Conventional authentication systems store user authentication information including user identifiers (such as a number or username) and associated authentication credentials (such as passwords) in lookup tables or databases. To improve security, many systems obscure the user identifiers and/or the credentials by encrypting the user information or applying hashing functions to the user information so that a hacker cannot readily determine users' credentials by obtaining unauthorized access to the user authentication information stored by the system. In some conventional systems, a user has no fixed credentials and instead responds to an authentication challenge instructing the user (or user device) to perform mathematical or other operations on information shared by the user and the authentication system but unknown to a potential hacker or other unauthorized third party.

BRIEF SUMMARY

An example embodiment provides a method of authenticating users of a computer system. The method includes receiving user credentials, generating a first challenge message on the basis of the user credentials. The first challenge message identifies devices in a first array of physical unclonable function devices (a first PUF array). The method also includes measuring physical parameters of the identified devices in the first PUF array, resulting in a first enrollment challenge response. The method also includes storing the first enrollment challenge response in a first addressable database at a first address determined at least in part by the user credentials.

The method further includes generating a second challenge message on the basis of the user credentials. The second challenge message identifies devices in a second array of physical unclonable function devices (a second PUF array). The method also includes measuring physical parameters of the identified devices in the second PUF array, resulting in a second enrollment challenge response. The method also includes storing the second enrollment challenge response in a second addressable database at a second address determined at least in part by the user credentials. The first and the second array PUF arrays are independent such that the failure of one PUF array does not prevent the computer system measuring devices in the other PUF array.

In another example embodiment, a method includes causing a computing with two or more arrays of physical unclonable function devices (PUF arrays) to receive user credentials, generate challenge messages, and generate and store initial challenge responses associated with the first PUF array by measuring physical parameters of PUF devices belonging to portions of the first PUF array identified by a first subset of the challenge messages. Each user credential includes a user identifier and a password associated with the user identifier. Each challenge message corresponding to a respective user credential; the method further includes causing the computing system to generate and store initial challenge responses associated with the second PUF array by measuring physical parameters of PUF devices belonging to portions of the second PUF array identified by a second subset of the challenge messages. The method further includes causing the computing system to perform a first authentication and a second authentication.

Performing the first authentication includes receiving a first user credential associated with a first user, generating a first challenge message corresponding to the first user credential, generating a first challenge response by measuring physical parameters of PUF devices belonging to a portion of the first PUF array identified by the first challenge message, comparing the first challenge response to an initial challenge response corresponding to the first user credential;

Performing the second authentication includes receiving a second user credential associated with a second user, generating a second challenge message corresponding to the second user credential, generating a second challenge response by measuring physical parameters of PUF devices belonging to a portion of the second PUF array identified by the second challenge message; and comparing the second challenge response to an initial challenge response corresponding to the second user credential.

In another example embodiment, a method includes receiving enrollment credentials of a user. The enrollment credentials include a user identifier of the user and an enrollment password. The method also includes generating a first challenge message associated with the user identifier on the basis of the password. The first challenge message identifies first devices in a first array of physical unclonable function devices (a first PUF array). The method also includes measuring physical parameters of the first identified devices, resulting in a first enrollment challenge response; and storing the first enrollment challenge response in memory of the system at a first address determined using the user identifier and the password.

The method further includes deriving a backdoor password associated with the user from the enrollment password. The backdoor password omits information in the enrollment password necessary to determine the enrollment password. The method also includes encrypting the backdoor password with a system password to produce an encrypted backdoor password; and generating a second challenge message associated with the user on the basis of the at least the backdoor password. The second challenge message identifies second devices in the first PUF array. The method also includes measuring physical parameters of the identified second devices resulting in a second enrollment challenge response, and storing the second enrollment challenge response in memory of the system at a second address determined at least in part by the enrollment credentials of the user and the system password.

In some embodiments, the method also includes executing an authentication process and a backdoor authentication process. The authentication process includes receiving a request to authenticate the first user that includes the user identifier and a password and generating an authentication challenge message on the basis of the received password. The authentication challenge message identifies the first devices in the first PUF array. The authentication process also includes measuring physical parameters of the identified first devices in the first PUF array, resulting in an authentication challenge response; and comparing the authentication challenge response to the enrollment challenge response.

The backdoor authentication process includes receiving a request to authenticate the first user that excludes the enrollment password, using the system password to decrypt the encrypted backdoor password, and generating a backdoor authentication challenge message on the basis of the backdoor password. The authentication challenge message identifies the second devices in the first PUF array. The backdoor authentication process also includes measuring physical parameters of the identified second devices in the first PUF array, resulting in a backdoor authentication challenge response; and comparing the backdoor authentication challenge response to the enrollment challenge response.

Another example embodiment provides an authentication system for authenticating users of a computer system. The system includes processing circuitry, memory coupled to the processing circuitry, and at least a first addressable physical unclonable function generator (APG) coupled to the processing circuitry. The first APG includes a first array of physical unclonable function devices (a first PUF array), The processing circuitry and the memory configured to perform an enrollment process that includes receiving enrollment credentials of a user including a user identifier of the user and an enrollment password and generating a first challenge message associated with the user identifier on the basis of the password. The first challenge message identifies first devices in the first array of physical unclonable function devices (a first PUF array). Performing the enrollment process also includes measuring physical parameters of the identified first devices resulting in a first enrollment challenge response, storing the first enrollment challenge response in the memory at a first address determined using the user identifier and the password, deriving a backdoor password associated with the user from the enrollment password, encrypting the backdoor password with a system password to produce an encrypted backdoor password, generating a second challenge message associated with the user on the basis of the at least the backdoor password, measuring physical parameters of the identified second devices resulting in a second enrollment challenge response, and storing the second enrollment challenge response in the memory at a second address determined at least in part by the enrollment credentials of the user and the system password. The backdoor password omits information in the enrollment password necessary to determine the enrollment password. The second challenge message identifying second devices in the first PUF array.

In some such embodiments, the processor and memory are further configured to perform an authentication process. The authentication process includes receiving a request to authenticate the first user that includes the user identifier and a password, generating an authentication challenge message on the basis of the received password, measuring physical parameters of the identified devices in the first PUF array resulting in an authentication challenge response, and comparing the authentication challenge response to the enrollment challenge response. The authentication challenge message identifies devices in the first PUF array.

The processor and memory are further configured to perform a backdoor authentication process that includes. Performing the backdoor authentication process includes receiving a request to authenticate the first user that excludes the enrollment password, using the system password to decrypt the encrypted backdoor password, generating a backdoor authentication challenge message on the basis of the backdoor password, measuring physical parameters of the identified devices in the first PUF array, resulting in a backdoor authentication challenge response, and comparing the backdoor authentication challenge response to the enrollment challenge response. The backdoor authentication challenge message identifies the second devices in the first PUF array.

The above features and advantages of the present invention will be better understood from the following detailed description taken in conjunction with the accompanying drawings.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

FIG. 3 depicts a table illustrating aspects of the method illustrated in FIG. 2.

FIG. 8 depicts a table summarizing preliminary steps of the authentication method illustrated by FIGS. 6-7

FIG. 9 depicts a table summarizing additional steps of the authentication method illustrated by FIGS. 6-8.

FIG. 10 depicts a graph illustrating performance of ternary PUF when used for challenge-response authentication.

FIG. 17 depicts registration steps in the normal operation of the system.

FIG. 18 depicts authentication steps in the normal operation of the system.

FIG. 19 depicts authentication when the first PUF stops working.

DETAILED DESCRIPTION

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

Conventional authentication systems have disadvantages. For example, if an attacker gains access to a lookup table or database storing the user authentication information, the attacker can apply various computational approaches to eventually decrypt or otherwise decode the information. As example, since many hashing functions are well-known, an attacker may guess a password, input that guessed password into a hashing function and find the output in the compromised table.

Accordingly, embodiments disclosed herein address these and other shortcomings by ensuring that authentication data remains secure even if that data is accessed or stolen. Rather than storing authentication data such as password as message digests produced by hash functions, embodiments herein use message digests as challenges supplied to a physical unclonable function (PUF) device. The resulting challenge responses obtained are then stored. If an attacker obtains access to the authentication data, attempting to "guess" passwords is computationally difficult, because neither passwords nor hashes of passwords are stored by the system. Because each PUF device is unique, the only way to identify a valid password by guessing (other than a brute force attempt using every possible password) would require the attacker to have access to both the data stored as reference, and the hardware containing the PUF.

Figure 1:
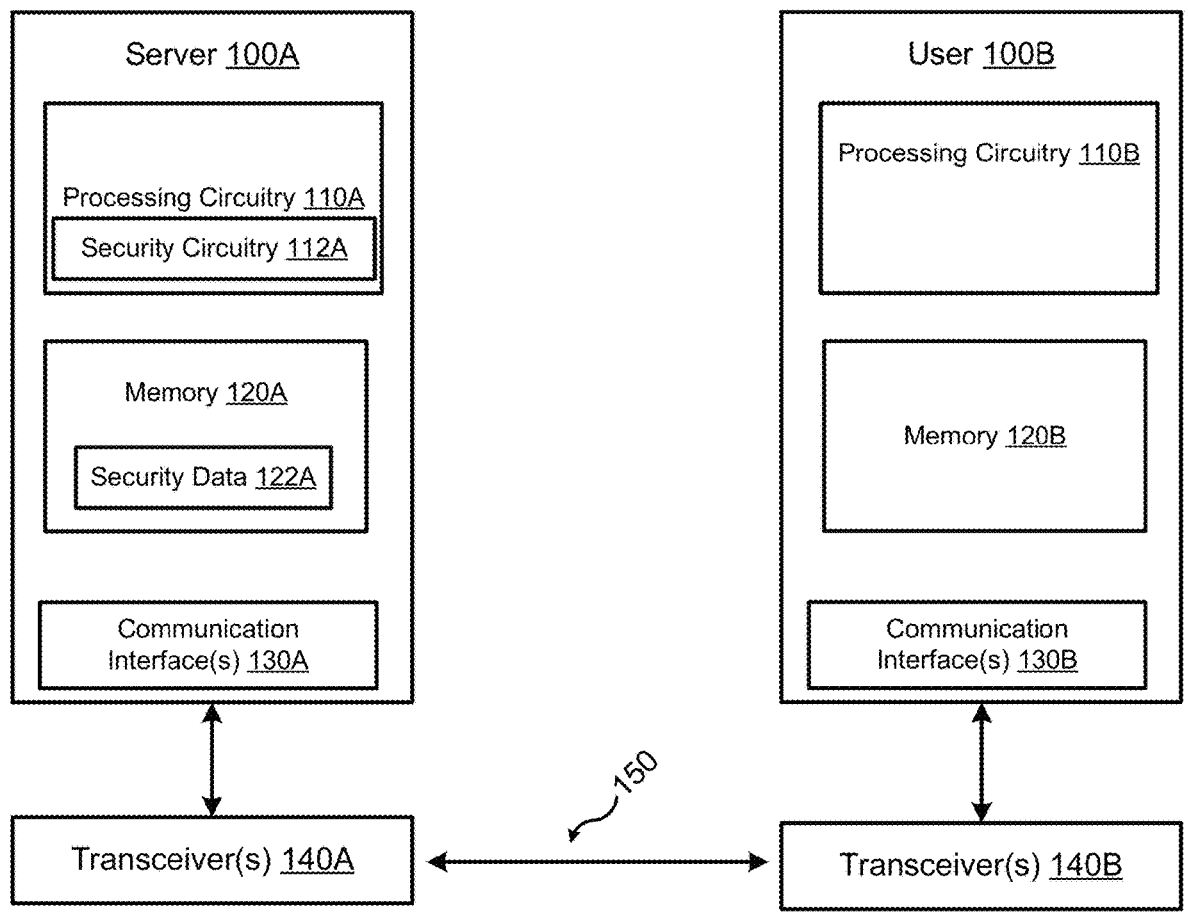
FIG. 1 depicts a block diagram describing example systems in which embodiments of the invention may be practiced.

FIG. 1 is a schematic illustrating a computing system 100A in which embodiments disclosed herein may be practiced. In this example, server 100A is an authentication server or other computing device which stores information used to authenticate users and client 100B is an example "client" or other "user" device. The computing systems 100A/B each have respective processing circuitry 110A/B, memory 120A/B, communication interfaces 130A/B, and transceivers 140A/B. Each system communicates sends and/or receives information via its communication interface 140A/B. The communication interfaces 130A/B are coupled to transceivers 140A/B which send signals over a communication channel 150. In embodiments disclosed herein the processing circuitry 110A of server 100A includes security circuitry 112A. Similarly, in embodiments disclosed herein the memory 120A of computing system 110A stores security data 122A. It should be understood that while the example of FIG. 1 involves a separate client 100B, embodiments disclosed herein may be practiced entirely within a single system such as the server 100A.

In preferred embodiments disclosed herein the processing circuitry 110A includes a dedicated PUF device such as the devices described later in connection to FIGS. 4 and 5, for example. In such embodiments, the security circuitry 110A is configured to respond to an authentication challenge which specifies an address (or range of addresses) in the PUF device and a set of operations to perform in order to generate a unique response to the authentication challenge. Such embodiments are designed to store security data 122A produced using the security circuitry 112A in the memory 120A. In such embodiments, the processing circuitry 110A is configured to generate authentication challenges and receive responses to those challenges. The responses and challenges may are saved as part of the security data 122A.

Figure 2:
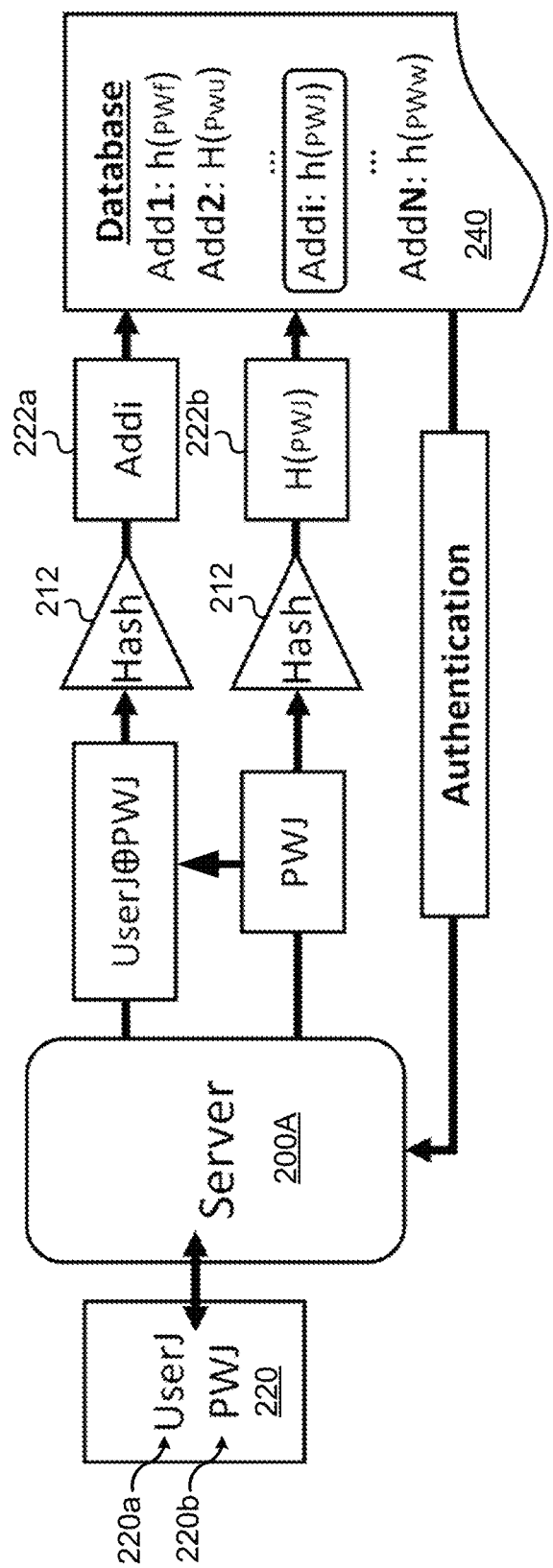
FIG. 2 depicts a block diagram describing elements of an example prior-art authentication system using a database and hashing functions.

FIG. 2 depicts a method of securing authentication information (e.g., a credential 220 that includes a user identifier 220a and password 220b) using hashing functions which is useful to understand elements of embodiments disclosed herein. Hash functions and one-way cryptographic methods can be used to protect or replace the tables containing user IDs with their corresponding passwords by look-up tables. As shown in FIG. 2, Hashing the password for User "J" ($PW_J$) with the hash function 212 results in the message digest $h(PW_J)$ 222b; the user ID $User_J$ and $PW_J$ are XORed; hashing $User_J \oplus PW_J$ results in the message digest 222a, notated as $h(User_J \oplus PW_J)$. The message digest 222a is stored in the database 240 at a coordinate XY determined by the message digest 222b During authentication, users provide their user ID/password pairs to the server 200A (e.g., server 100A); the information extracted from the table at the corresponding address is then compared with the message digest provided by the password. When SHA-1 is replaced by more powerful hashing functions (e.g., SHA-3), such look-up tables are much more secure than the tables directly storing user ID/password pairs. However, if look-up tables storing message digests are compromised or stolen, the information can be recovered by an attacker using password guessing methods, big data analysis, and brute force hashing of commonly-used passwords.

Figure 3:
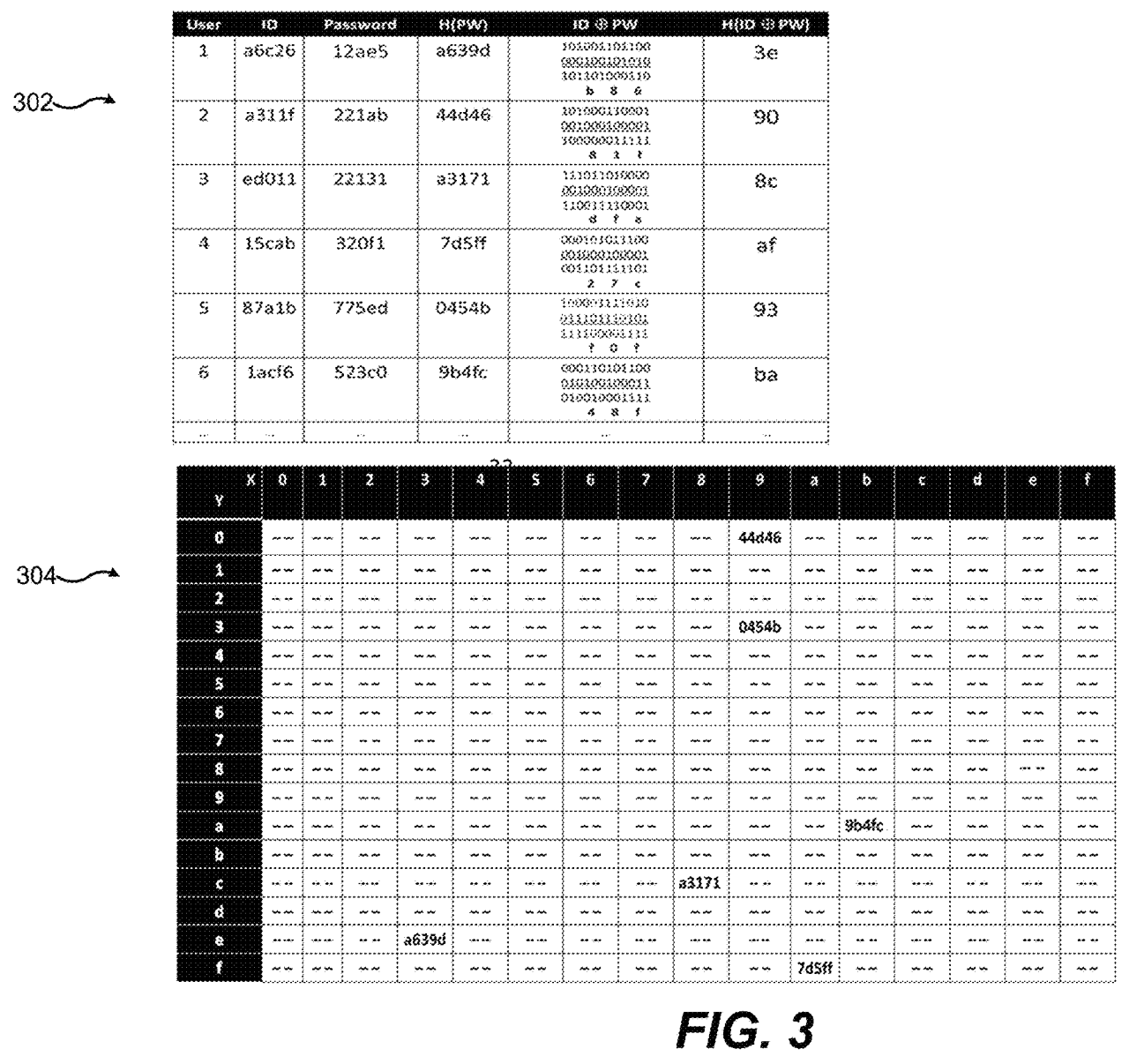

The scheme described in connection to FIG. 2 above is further illustrated by the tables 302 and 304 shown in FIG. 3. Table 302 lists six example users (User #1-User #6). Each user has a user ID and a password. For each example user, table 302 shows the user's ID and password, along with a message digest of the user's password, the result of combining the user's ID and password using the XOR function, and a message digest of that combination.

Table 304 is a representation of a 2D array used to store authentication information for each of the example users. The array is indexed using a 'X' coordinate and a 'Y' coordinate. Values for each example user are shown at locations in the array chosen as described below.

For example, as shown in the first row of table 302, User #1 has a user ID "a6c26", a password "12ae5." The message digest of User #1's password is 0xA639 generated with SHA-1 (following the convention of indicating a hexadecimal value by the prefix 0x'). Only the first five characters of the message digest are kept. XORing the first three hexadecimal characters of the user ID and the password produces the value 0xB86. Hashing of 0xB86 with SHA-1 generates a message digest that has '3E' as first two hexadecimal characters. Then the value 0xA639 is stored in the table at address 0x3E, where the first hexadecimal digit is the 'X' coordinate and the second hexadecimal digit is the 'Y' coordinate. Five more user ID/password pairs are stored in a similar way in the bottom right look-up table of FIG. 3. Such a method is applicable to store very large quantities of user ID/password pairs.

Figure 4:
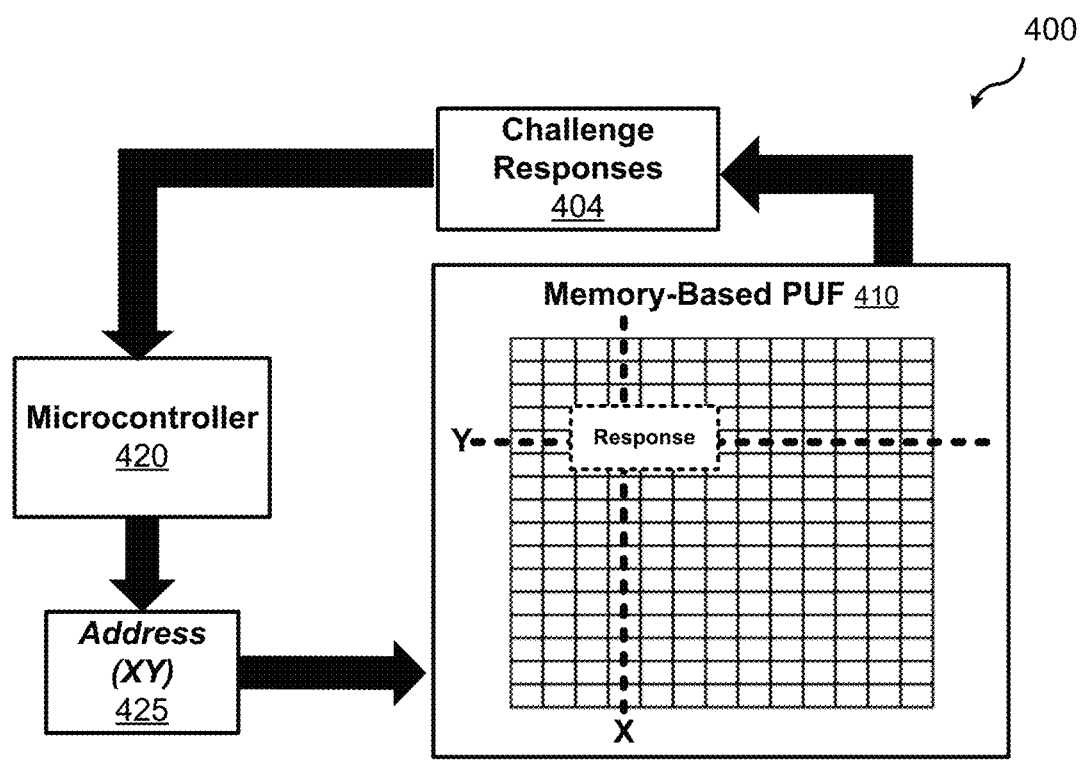
FIG. 4 depicts a schematic view of an example prior-art memory-based physical unclonable function (PUF) device usable to generate responses to authentication challenges.
Figure 5:
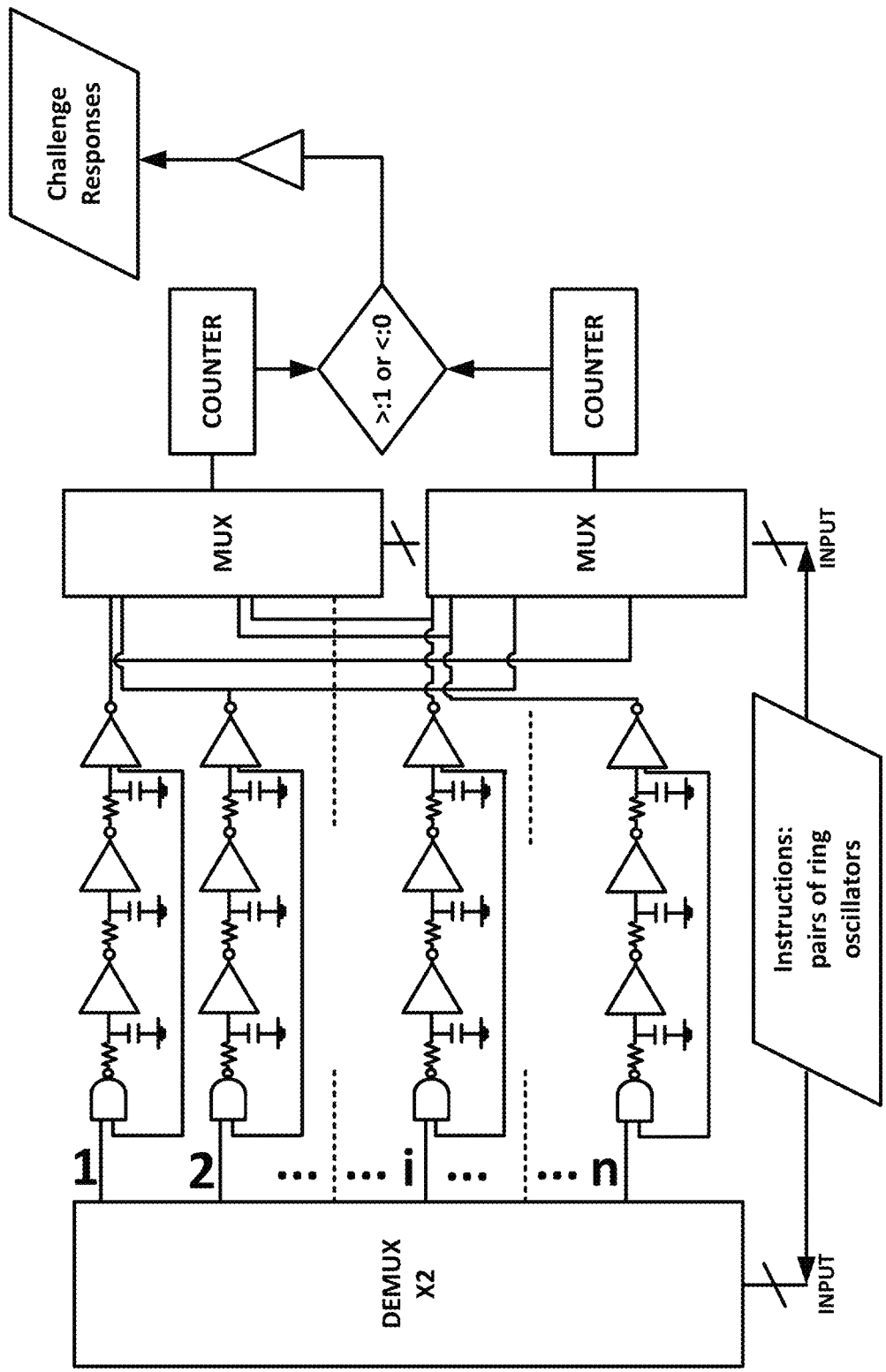
FIG. 5 depicts a schematic view of an example prior-art ring-oscillator-based PUF device usable to generate responses to authentication challenges.

FIG. 4 is a schematic of a memory-based addressable PUF generator (APG) 400. In a simplified example, a microcontroller 420 accesses an address (or range of addresses) 402 of the PUF array 410, and receives a challenge response 404. In the simplest case, the address 402 is the challenge and the values stored in the PUF array 410 are the responses 404. Alternatively, the microcontroller 420 may execute instructions causing it to perform a set of mathematical or other operations (which, together with the specified address or address range 425 constitute the challenge) on the values retrieved from the PUF array 410. Alternatively, another generic method to generate challenge responses from memory devices is to characterize a particular parameter $\mathcal{P}$ of the cells of the array. The values of parameter $\mathcal{P}$ vary cell to cell and follow a distribution with a median value T. In order to generate challenge response, all cells with $\mathcal{P}<T$ generate "0" states, and the others generate "1" states. Assuming that the measurements results from one PUF device are distinct from those of any other PUF device and that the measurement results of any one PUF device are suitably reproducible, resulting streams of data can be used as PUF challenge responses for authentication purposes, where the input used to generate each response is stored for future use as a challenge.

The underlying devices in an example PUF device may include arrays of transistors and circuitry configured to measure variations in threshold voltages or other physical device characteristics. Memory structures, such as SRAM, DRAM, Flash, ReRAM, and MRAM, are also excellent elements to generate strong PUFs. PUF devices may also be designed to include the use of logic components with gate delays and arbiters and ring oscillators. FIG. 5 depicts an example PUF device in which pairs of ring oscillators are analyzed. In the example device shown, if the number of ring oscillations routed through the top MUX in a given period is greater than the number of ring oscillations through the bottom MUX during that period, the challenge response value corresponding to that pairing (when measured either during an initial setup procedure or as a response to a remotely-generated challenge) is a "1"; if not, the response value is a "0". If for example, the addresses of 128 successive pairs are transmitted to the PUF, 128-bit challenge responses are generated.

APGs are operated in two modes when used for challenge-response authentication. During an initial "registration" operation, the characteristics of the PUF are measured and stored for later reference. These characteristics may be measured and stored directly, or in the form of responses generated to a set of potential challenges. The response values may be absolute or relative value of the parameters within the multiple cells that are selected within a particular range of addresses. Therefore, as a particular cell may produce the value '0' when part of one group of cells, and the value '1' when part of a different group, or when read using different challenge instructions.

Challenge instructions "tell" the APG what to do with the measured characteristics of a given cell (or range of cells). In a trivial example, the instructions would simply instruct the APG to return the measured characteristics directly. Challenge instructions may also specify a set of mathematical operations to apply to the measured characteristics in order to generate a response.

Because the PUF is secured within the server (and may be further protected using known anti-tampering methods), a hostile party cannot simply read the entire PUF array and use the information to communicate with a network of client devices. Physically reproducing ("cloning") the entire PUF device array would be a security threat; however, the random variations in circuit fabrication and other manufacturing methods which make it possible to fabricate unique PUF arrays using identical manufacturing steps possible in the first place make it unlikely that a hostile part could replicate a given PUF device array even if the design of that device were known.

Figure 6:
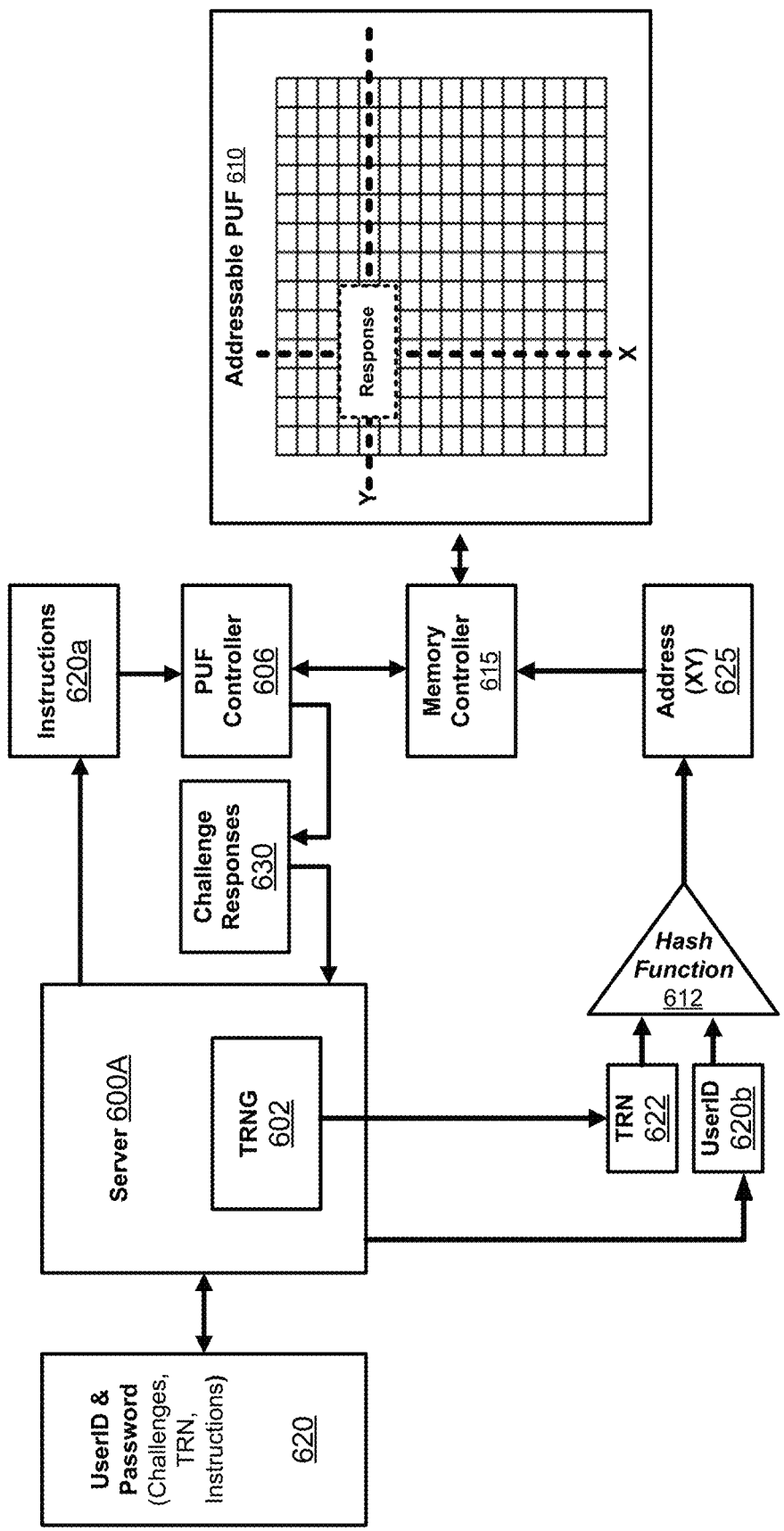
FIG. 6 depicts a flowchart illustrating elements of an example authentication method disclosed herein using an addressable PUF device.

FIG. 6 illustrates an example architecture for multifactor authentication using an addressable PUF array 610. FIG. 6 and the accompanying description will be used to illustrate various operating principles of challenge-response authentication schemes using PUFs. The PUF array 610 (shown here as a 2D-array of cells) can be addressed using a memory controller 615, which receives a specified address 625. The memory controller 615, together with the PUF controller 606 are configured to return characteristics of the PUF array 610 at the address 625 (or a range of addresses), as challenge response 630. The challenge responses 630 may be specific characteristic of queried cells (or ranges of cells), or may be derived from those characteristics by the PUF controller 606. Non-limiting examples of such characteristics are time delays of transistor-based ring oscillators and transistor threshold voltages. Other non-limiting examples include optical devices. For example the PUF device may be an optical PUF device which, when illuminated by a light source such as a laser produces a unique image. This image may be digitized and the pixels may be used to form an addressable PUF array.

In this example a user possesses a PUF such as PUF array 610. Upon activation, the user needs to securely exchange with the server 600A (e.g., server 100A), or another party from which the server 100A can securely retrieve information), the measurements of physical elements describing the PUF (or information derived from those measurements). This can be a set of parameters, P, produced by measuring each cell of the PUF array 610. A request to measure the parameters and/or perform further mathematical operations on those parameters may be variously referred to as "authentication challenges" or "challenges." The initial measurements of the PUF, may be various referred to as "authentication challenge responses," "challenge responses," or simply "responses." Using this terminology, the server 600A (or another party) generates a set of challenges during an initialization process and issues to challenges to the user (or a party in possession of user's PUF at the time of the initialization). The responses obtained to the initial challenges are stored for reference by the server 600A. When the server 600A subsequently sends an authentication challenge, the user can independently re-measure the parameter(s) P at the specific locations of his PUF array to generate appropriate challenge responses. Challenges and the corresponding challenge responses represent a fingerprint of the PUF. With quality PUFs, the hamming distance between challenges and responses is small.

As shown in FIG. 6, the challenges are generated by supplying a message 620 (which includes instructions 620a and a password 620b) to the server 600A. The server 600A contains a random number generator such as the true-random-number generator (TRNG) 602, which sends the instructions 620a, which specify how to generate the challenge responses 630 to the memory controller 615. The memory controller 615 receives the instructions 620a and the desired address 625 to query. The desired address 625 is generated by a hash function 412 which hashes the combined password 620b and random number 622 to yield the address 625. Using the instructions 620a and the address 625, the memory controller 615 retrieves the appropriate challenge response 630 and delivers it to the memory controller 615, which delivers the appropriate challenge response 630 to the server 100A. In this example, all possible challenges are issued in advance and the challenge responses 630 are stored by the server 100A in a lookup table prior to the server 100A and the user communicating using the protocols described earlier. In such architectures, the PUF array 610, and memory controller 615 are possessed by the user.

Figure 7:
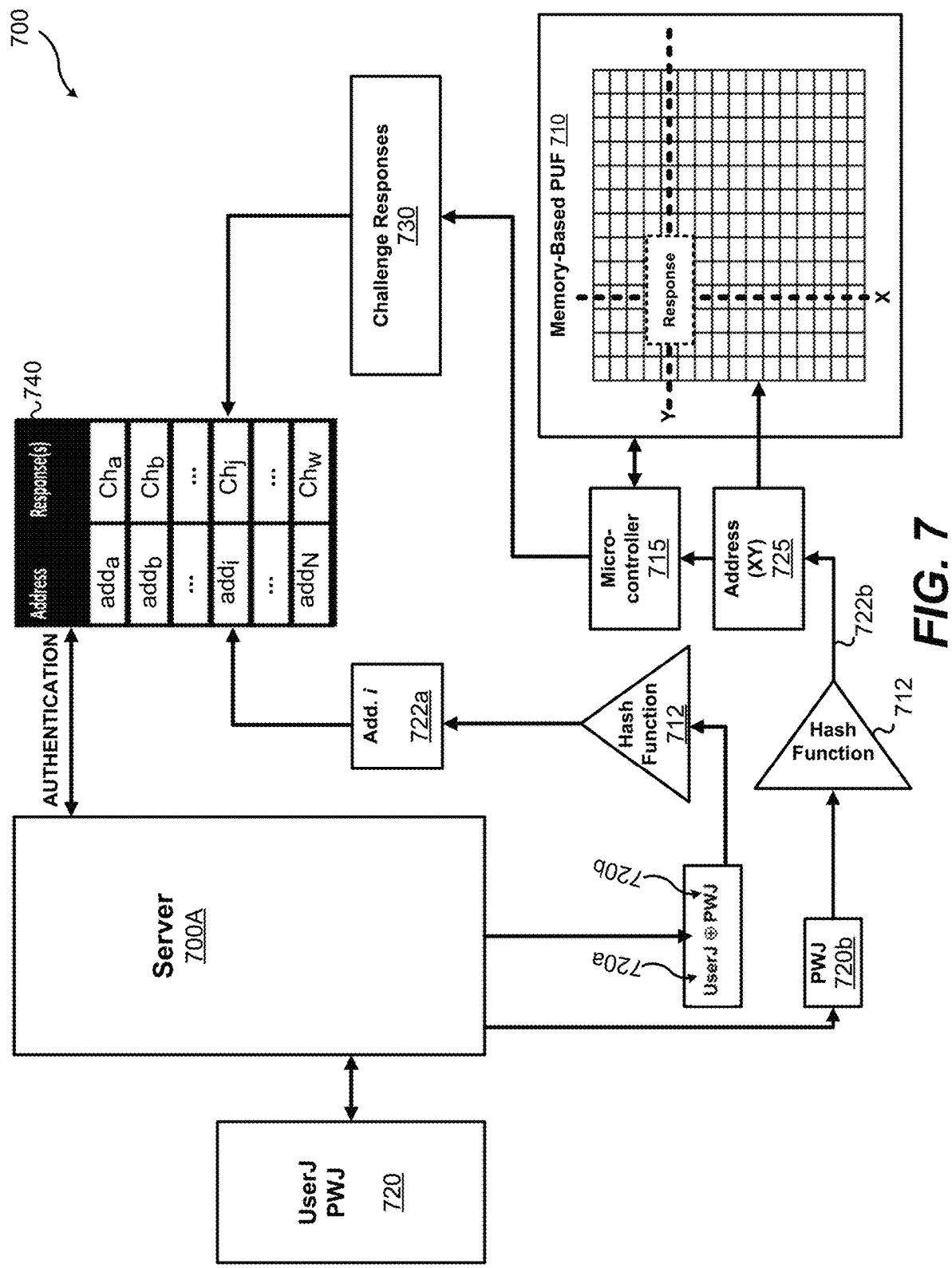
FIG. 7 depicts a flowchart illustrating additional elements of the example authentication method of FIG. 7

Now that certain operating principles have been discussed, now are described various inventive embodiments utilizing APGs within the server (e.g., server 100A, 200A, 600A) to provide authentication while securing user credentials against security breaches. In various embodiments disclosed herein, APGs are combined with hash-function-based password management, discussed earlier in connection with FIGS. 2-3. A block diagram describing an example of such an embodiment 700 is shown in FIG. 7. As shown, a device such as the server 100A receives a user identifier 720a and password 720b (collectively authentication information 720). The server 100A hashes the password 720b using a hashing function 712. The resulting message digest 722b is then used by a microcontroller 715 forming part of the security circuitry of a server (e.g., security circuitry 112A of the server 100A) to locate an address 725 in the APG 710. For example if the memory space of the APG 710 is an array of 4,096×4,096 cells, the first 12 bits of the message digest 722b can be used to find the address X in the array, and the next 12 bits to find the address Y. Starting from this address 725, challenge responses can be generated from a range of n cells starting at (or otherwise identified by) the address 725. The parameter $\mathcal{P}$ is then measured and responses 730 to the challenge $Ch_j$ consisting of a stream of bits $\{Ch_1, Ch_2, \ldots, Ch_n\}$ are generated. It should be understood that the 2-dimensional addressing scheme discussed is a non-limiting example and that any suitable PUF addressing scheme may be used in embodiments disclosed herein.

A second address 722a, denoted by $Add_i$ is generated using the user ID 720a and the password 720b. In this example, the user ID 720a is XORed with the password 720b and hashed using hashing function 712 to produce the message digest 722a, used as the address, The challenge response 730 (denoted $Ch_j$ for $User_j$) is stored in a look up table or database 740 at the address specified by this digest 722a, i.e., $Add_i$. Since hash functions are one-way functions, it is impossible to deduce the input of the hash function by looking at the address of a PUF array. Unlike traditional data storage units, the memory arrays used in the APG 710 are not used to store information in any conventional sense; i.e., appropriate challenge responses 730 cannot be generated from these PUFs without using instructions which, taken together with the address (or range of addresses) 725 form a valid challenge. If an attacker gains access to the database 740, a stored challenge response is useless without the message digest 722b of the corresponding password 720b. This offers additional layers of security.

The authentication process follows a similar sequence to the one described above for challenge generation. The challenge responses 730 generated from the APG 710 are compared with the previously-generated challenge responses 730 stored in the database 740 (or lookup table) at the same address. When the newly-generated challenge responses 730 agree with the previously-generated challenge responses 730 (or the responses match to a sufficient degree), authentication is successful.

FIG. 8 summarizes an example method 800 performed in connection with various embodiments to store challenge/response data, for future reference during authentication as described above. It should be understood that foregoing descriptions of various methods having express or implied sequences of steps and sub-steps are intended for purposes of illustration only and that steps may be performed in any suitable sequence. The various steps of method 800 will be described with reference to embodiment 700 for easier understanding.

At Step 1 the password 720a, i.e., $PW_j$, is input into the hash function 712 to generate a message digest 722b, i.e., $h(PW_j)$ which denotes the hash of $PW_j$. Additional security features may include the use of cryptography to protect the password and multi-factor authentication to protect the user. The hash function can be any suitable hash function, including, for example, a conventional hash function such as SHA-1.

At step 2 the message digest 722b is used to generate the address (or address range) 725 to be accessed within the PUF device 710. As suggested above, the address 725 may be the first 24 bits of the message digest, if the size of the memory array is 4,096×4,096, for example. Different possible schemes are presented below.

At step 3 the generation of a stream of challenge responses 730, denoted by $Ch_j=\{Ch_1, \ldots, Ch_n\}$ for $User_j$ are received from the APG 700, using information from n cells specified by the address (or range of addresses) 725. The exact mechanism of accessing the PUF device 710 will vary based upon the underlying device technology and various response generation protocols adapted to the particular technology implementation. In example method 800 of FIG. 8, sub-step 3.1 entails measurement of the particular parameter $\mathcal{P}$, for each cell, as described above. In, sub-step 3.2, the challenge response 730 is generated using the measurement(s).

At step 4 the user ID 720a, represented by ID $User_j$, and password 720b, represented by $PW_j$, are XORed to generate a data stream, shown as $User_j \oplus PW_j$. Use of the Boolean XOR function is a non-limiting example of combining the UserID 720a and password 720b and can be replaced by other methods.

At step 5 the message represented by $User_j \oplus PW_j$ is hashed by the hashing function 712 to produce the message digest 722*a*, which is in turn used to specify the address in the database 740 (or lookup table) denoted by Add$_i$. If, for example, a look-up table having 4,096×4,096 positions is used, the first 24 bits of the message digest can be used to generate Add$_i$.

Finally, at step 6, the challenge responses Ch$_j$={Ch$_1$, . . . , Ch$_n$} are stored in the database 740 (or lookup table) at the address specified by Add$_i$. In case of a collision (i.e., multiple users at the same address), multiple sets of challenge responses 730 may be stored at the same address, allowing authentication to proceed without undue complexity. In this instance, the server 100A could simply search as a many sets of challenge response 730 as needed until a match us found (or until all the challenge responses at Add$_i$ have been searched).

FIG. 9 summarizes an example method 900 performed in connection with various embodiments to authenticate a user such as user 100B. Steps 1 through 5 of example method 900 are similar to those of example method 800 described above in connection with FIG. 8 and will be similarly described with reference to embodiment 700. However, in this example method, the (e.g., server 100A, 200A, 600A) already has the expected challenge responses 730 stored in the database 740 comprising security data (e.g., security data 122A). In this method, the server issues challenges to the APG 700 (i.e., the security circuitry 112A) and compares challenge responses 730 newly-generated by the APG 700 to expected values of the challenge responses 730 previously-generated as described above in connection to FIGS. 7-8. At step 6, the stored challenge response 730 (denoted as Ch$_j$) are read by the server. At step 7 the stored challenge responses 730 (denoted by Ch$_j$) are compared with the challenge responses 730 newly-generated by the APG 700 using a bitwise comparison (i.e., an XOR operation).

Because the responses 730 are the product of physical measurements of the parameter(s) $\mathcal{P}$, which may be influenced by external factors (e.g., temperature) and other sources of nondeterministic behavior some variation in the measured parameters is possible. Typical conventional binary PUF devices such as those described thus far produce error rates of approximately 3-10%. Generally, error rates as high as 10% are acceptable when the challenge responses are long enough (e.g., longer than 128-bits). However, ternary PUF devices described below can be used to improve the performance of APGs and reduce error rates.

Ternary PUF architectures are based on three states, and incorporate a "fuzzy state" to denote a cells whose responses are unpredictable. The error rate measured using the remaining well-behaved device states is significantly lower. FIG. 10 shows error measurements of prospective PUF devices based on commercially-available SRAM. SRAM PUFs exploit power-off/power-on cycles. Due to micro-manufacturing differences, the flip-flop of each SRAM cell will randomly emerge from being powered on in the '0' or the '1' state. The vast majority of the cells respond in a predictable way, therefore acting as a "fingerprint" of the device. SRAM arrays have been characterized, exhibiting a cumulative 3-5% CRP rate after each power-off/power-on cycle. The memory cells were then subjected to successive power-off/power-on cycles and cells exhibiting inconsistent ("fuzzy") behavior were represented by the ternary state 'X.' After 50 cycles, the 'X' state was assigned to 10% of the cells. For the remaining cells which were not assigned the 'X' state, the error rate was in the 0.01-0.03% range. The upper plot in FIG. 10 shows the effective error rate with increasing number of cycles (from 1-139) and the lower plot shows the percentage of cells identified as "fuzzy." For example, after 1 trial, the error rate is ~3-5% and very few (or zero) cells are "fuzzy." At ~70 trials, the number of masked cells is about 10% and the resulting error rate is ~0.01-0.03%.

The methods and systems described above can be modified to incorporate ternary PUF devices. In one example embodiment, the ternary state associated with each PUF element is determined during the initial generation and storage of the challenge responses 730. In this embodiment, the stored challenge responses 730 incorporate ternary values (as opposed to binary) for each element of the PUF array 710 and are stored in the database 740 as shown in FIG. 7. As an example, the ternary '0' state can be represented by the binary string (01), the "1" can be represented by the binary string (10), and the 'X' state can be represented by the binary string (11). During authentication, only values produced by well-behaved devices are used to measure the mismatch between the newly-generated challenge response 730 and its expected value. Such a protocol can be implemented using measurement of the parameter(s) $\mathcal{P}$ of elements in memory-based PUFs such as the PUF array 710.

In such embodiments, it is necessary to define what constitutes a "fuzzy" device and what constitutes a well-behaved device. In a non-limiting example, the values measured are binned. The bottom tertile (third) of values are chosen as the '0' state, the top tertile of values are chosen to represent the '1' state, and the middle tertile of values are assigned to the 'X' ("fuzzy") state. During response generation for authentication, the same n cells originally measured and the measured values are similarly binned to determine the appropriate binary string to use as the output for each cell.

In some embodiments, the entire PUF array 710 can be characterized in advance, and the 'X' state can be assigned to all "fuzzy" cells. In such embodiments, the previously-measured "fuzzy" cells are excluded from the authentication process. During the initial characterization of the PUF array 710, the "fuzzy" cells located at the address 725 (or within an address range specified by address 725) are ignored, and the remaining cells are treated as being well-behaved. The resulting challenge responses 730 consist of streams of bits that are stored in database (or lookup table) 740 for reference. During authentication, the same "fuzzy" cells are ignored. The newly-generated challenge responses 730 are compared with the reference values for the challenge responses 730 previously stored in the database 740 (or lookup table). In certain embodiments, the challenge responses 730 are always of the same length. As an example, in such embodiments, the challenge instructions may cause the security circuitry 110A to query the first n well-behaved cells found starting at the address 725, skipping over any "fuzzy" cells until a total of n cells have been queried.

The embodiments described thus far rely upon storing challenge responses (such as the challenge responses 730) generated by an APG (such as the APG 700 shown in FIG. 7). Each response 730 is stored in the database 740 (or lookup table) at an address determined by the message digest 722*a* which is the result of hashing a combination of the user ID 720*a* with the password 720*b* (e.g., User$_j$⊕PW$_j$). However, in some embodiments, heightened security can be realized by using additional challenge responses to specify the lookup table address as well.

Figure 11:
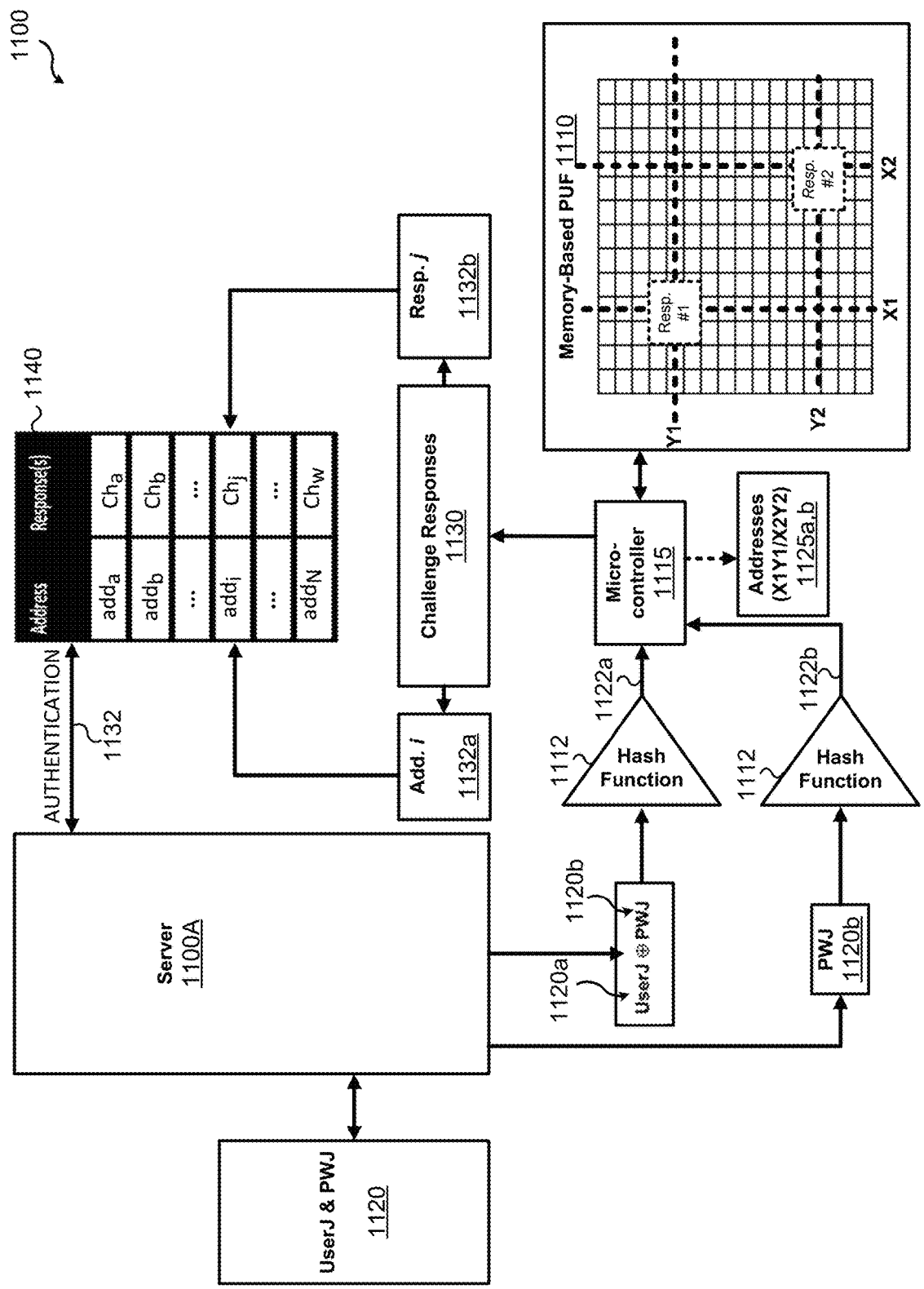
FIG. 11 depicts a hybrid flowchart and block diagram illustrating an alternate authentication system disclosed herein using a memory-based PUF device.

One such embodiment 1100 is illustrated by FIG. 11. As shown in FIG. 11, a device such as the server 100A receives a user identifier 1120*a* and password 1120*b* (collectively authentication information 1120). The server hashes a combination of the user ID 1120*a* and the password 1120*b* to produce the digest 1122a using a hashing function 1112. The server 100A also hashes the password 1120b using the hashing function 1112.

The message digest 1122a is then used by a microcontroller 1115 forming part of the security circuitry 112A of the server 100A to locate an address 1125a in the APG 1110. The address 1125a is used to generate a challenge response 1132a which is used to specify an address in the database 1140 which comprises the security data 122A of the server 100A. The message digest 1122b is similarly used to generate challenge response 1132b. This challenge response (1132b) will be used for future authentication of the user 100B to the server 100A. The association of the address 1132a with the challenge response 1132b in the database 1140 jointly form authentication information 1132.

It will be appreciated that although this approach increases security by obscuring both the password and addressing scheme used for authentication information 1132, it is susceptible to errors between the challenge response 1132a as measured initially for a given UserID and password and subsequent challenge responses 1132a for the same UserID and password due to PUF errors as described above. Specifically, a PUF error occurring in the challenge response 1132b will cause the server 100A to access the wrong address in the database 1140.

It can be shown that ternary PUFs can be used to make realization of embodiments such as embodiment 1100 more practical. Given the previously cited error rates of 3-10% for binary PUFs, the incidence of addressing errors in embodiments similar to embodiment 1100 using binary PUF devices can be estimated with statistical models such as Poisson's model. For example, if the challenge-response comparison (CRP) error rate is 10% with 24-bit response lengths, the probability of at single-bit-or-larger error in the address is 91%, and the probability of at least a two-bit-or-larger error is 69%. These error rates are prohibitively high. However, with ternary states, if the CRP error rate is 0.03% (within the range discussed above in connection with FIG. 10) the probability of a single-bit-or-larger error is only 0.7%, the probability a two-bit-or-larger error is reduced to $2.6 \times 10^{-5}$ and the probability of a three-bit-or-larger error is reduced to $6 \times 10^{-8}$.

Details of an example authentication method accounting for CRP errors are disclosed below. After receiving a challenge responses 1132a, 1132b the server 100A accesses the address 1132a corresponding to the response 1132b and compares the response at the address 1132a with the corresponding authentication data 1132 previously stored for reference. If the response at the address 1132a matches, authentication is successful. If the response at the address 1132a does not match, the response 1132a may have specified an incorrect address in the database 1140 due to a CRP error. To account for possible errors in the response 1132a, the server 100A begins searching the database 1140 using addresses with a hamming distance of 1 relative to the received response 1132a. If the response stored at the address 1132a matches a previously stored response in one of the other addresses, authentication is successful. If a match is not found, the server 100A may proceed to search for matches using addresses with a hamming distance of 2 relative to the address 1132a. If a match is found at one of these addresses, authentication is successful. If a match is not found, authentication fails.

If the address 1132a specifies a 24-bit address in the database 1140, the server 100A only needs to search 24 additional addresses, since there are only 24 addresses with a Hamming distance of 1 relative to any given address 1132a. This does not represent a significant computational burden. The number of addresses with a Hamming distance of 2 from a given 24-bit string is 24-choose-2 (276), which is still not computationally expensive to check (and is not expected to occur with high frequency). The resulting false rejection rate (FRR) of such a protocol is $6 \times 10^{-8}$, which is due to the extremely low probability of responses with Hamming distances of three or more between a newly-generated address 1132a and the correct database address, specified by the originally-generated value of the address 1132a. This level of FRR is small and acceptable to users. This protocol scales well when the size of the database 1140 increases. For example, look-up tables with 36-bit addresses can store 68 G addresses, which is 65,000 larger than a look-up table bit 24-bit addresses. There are only 36 addresses with a Hamming distance of 1 with a given response and 36-choose-2 (630) addresses with a Hamming distance of 2.

Figure 12:
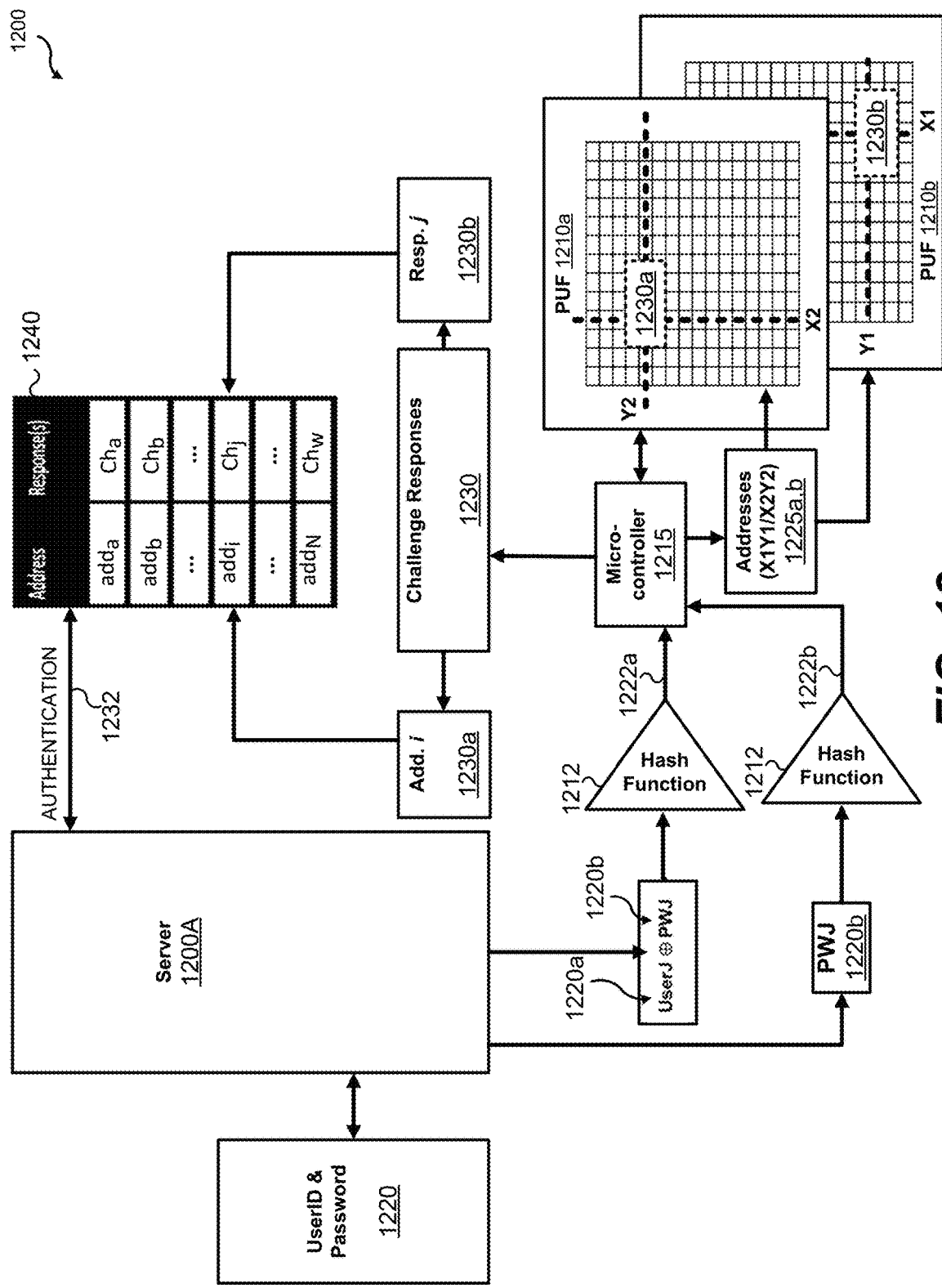
FIG. 12 depicts a hybrid flowchart and block diagram illustrating another alternate authentication system disclosed herein using multiple memory-based PUF devices.

The methods disclosed above in connection with embodiment 1100 and FIG. 11 can also be implemented using two distinct PUF arrays, as shown in FIG. 12 which depicts an example embodiment 1200. In embodiment 1200, The PUF array 1210a is used to generate a challenge response 1230a using the digest 1222a (the result of using a combination of the user ID 1220a and password 1220b as the input to the hashing function 1212) and the PUF array 1210b is used to generate challenge responses using the digest 1222b based on the password 1220b. The message digest 1222a is used by the microcontroller 1215 to access the address 1225a (or range of addresses) of the PUF array 1210a to generate the response 1230a. Similarly, the message digest 1222b is used by the microcontroller 1215 to access the address 1225b (or range of addresses) of the PUF array 1210b to generate the response 1230b. The authentication information 1232 (the association of the challenge response 1230b with the address specified by the challenge response 1230a) is stored in the database 1240.

Figure 13:
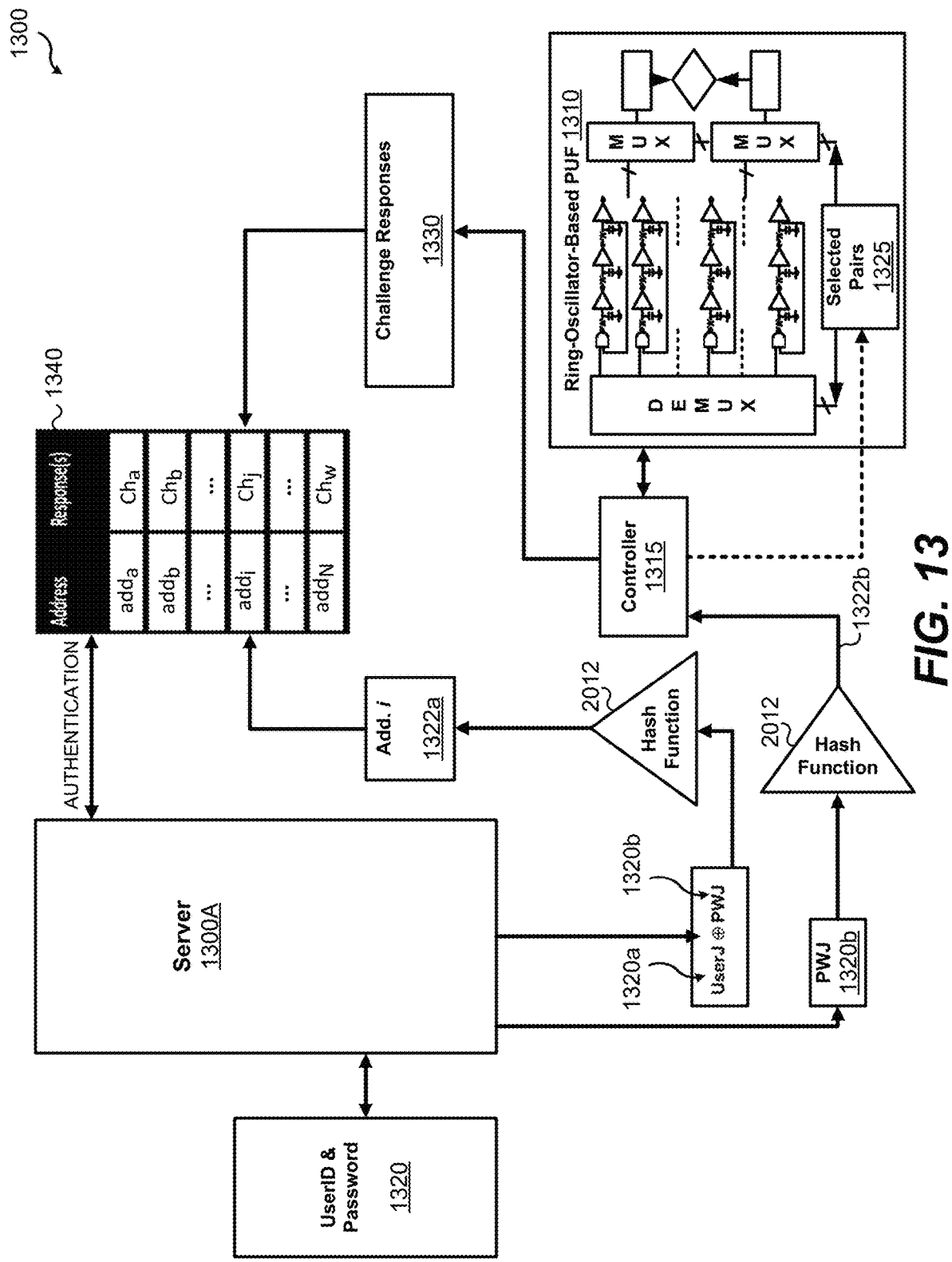
FIG. 13 depicts a hybrid flowchart and block diagram illustrating yet another alternate authentication method disclosed herein using a ring-oscillator-based PUF device.

Embodiments using PUFs designed to generate responses using methods based on logic gate delays and ring oscillators can be used instead of memory-based arrays, as previously discussed. FIG. 13 depicts an example embodiment 1300 where the PUF array 1310 comprises an array of ring-oscillator circuits. The operation of embodiment 1300 is analogous in most ways to the operation of embodiment 700. However, in embodiment 1300, the message digest 1322b specifies pairs 1325 of ring oscillator circuits rather than memory addresses (compare with digest 722b specifying address(es) 725 in embodiment 700, described in connection to FIG. 7).

Ring-oscillator PUFs can also be used as ternary PUF devices. During the generation of reference challenge response values using ring-oscillator PUF devices, a particular pair of ring oscillators are compared to produce a '0' or '1' value depending on whether the number of oscillations over a certain time period differs between the two oscillators. For example, if the first oscillator produces a number of oscillations sufficiently greater than the number produced by the second oscillator over the same time period, a '1' value is returned. Similarly if the second oscillator produces a number of oscillations sufficiently greater than the first oscillator, a '0' value is returned. When the difference is below a predetermined threshold, the APG assigns the "fuzzy" 'X' state to that pairing of oscillators. During the response generation, only the well-behaved pairs (i.e., not "fuzzy") are used to generate a '0' or '1' value. The CRP matching estimate is based on the well-behaved pairs that were generated during challenge generation, while the pairs with fuzzy state are ignored. This results in a reduction of CRP error rates.

In certain example embodiments, the message digest used to specify an address in a memory-based PUF device (e.g., digest $722b$ and address(es) $725$ of embodiment $700$) is larger than the number of bits required to specify a valid address. In this case, the message digest may be partitioned to specify multiple addresses (or address ranges). Previous examples described PUF devices with arrays of 4,096×4096 cells. The first 12 bits were used to specify the X coordinate, and the next 12 bits were used to find the Y coordinate. The n-cells located after that address are used to generate PUF challenges (or responses) that consist of n-bits. Considering message digests contain long streams of bits, typically 512, k addresses in the APG can be selected from each message digest, and m cells can be used by address to generate the n-bit challenges (or responses), with n=km. For example if n=512, and k=16 addresses are selected from the message digests, m=32 bits are generated at each address. This largely increases the randomness of the protocol.

In embodiments described thus far utilize a single PUF array and a single database. In some applications, lower latency for authentication of multiple users may be desirable. In addition, in embodiments utilizing only one PUF, failure of that PUF array (or any failure of access to that PUF array), may cause the whole authentication system to fail. Accordingly embodiments described below provides for redundant PUF-based password management by a server (e.g., a server $100A$) using resilient architectures which provide improved latency and/or one or more backup components in case of a failure. In some embodiments, the system and method include multiple PUFs and/or the creation of multiple databases.

Figure 14:
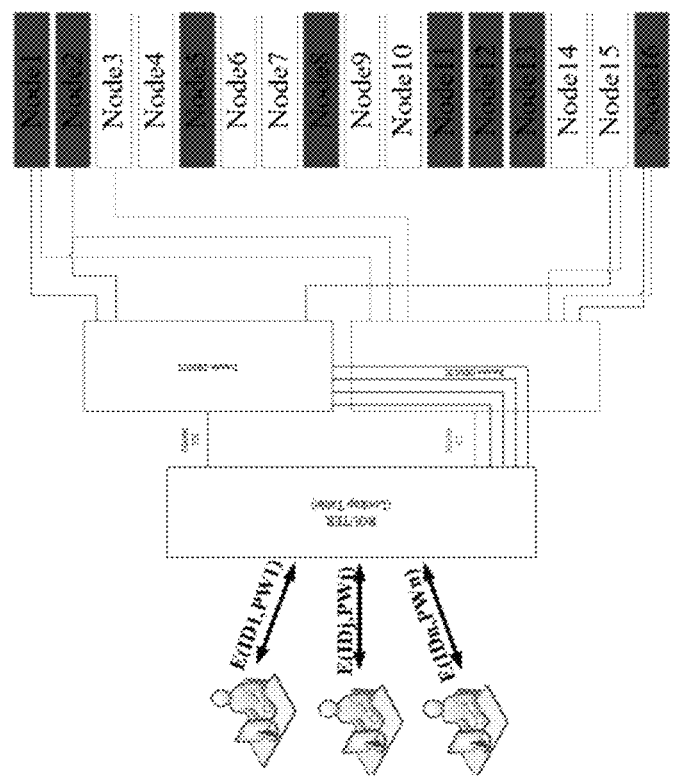
FIG. 14 depicts a resilient architecture according to certain embodiments.

Resilient architectures includes a secure backup mechanism in the event of a failure of one of the PUFs. Such architectures are based on the use of multiple PUFs and/or the creation of multiple databases. FIG. 14 shows an example network architecture $1400$ suitable for improving the latency of authentication in PUF-based password management systems (e.g., a sever $100A$, $200A$, $600A$). In this example, authentication requests for different users are load-balanced by routing requests to different nodes. However, if one PUF fails, a group of users whose authentication requests are processed using that PUF will fail. Solutions provided herein provide redundancy so that if one PUF fails, the system continues to operate without causing authentication failures.

Figure 15:
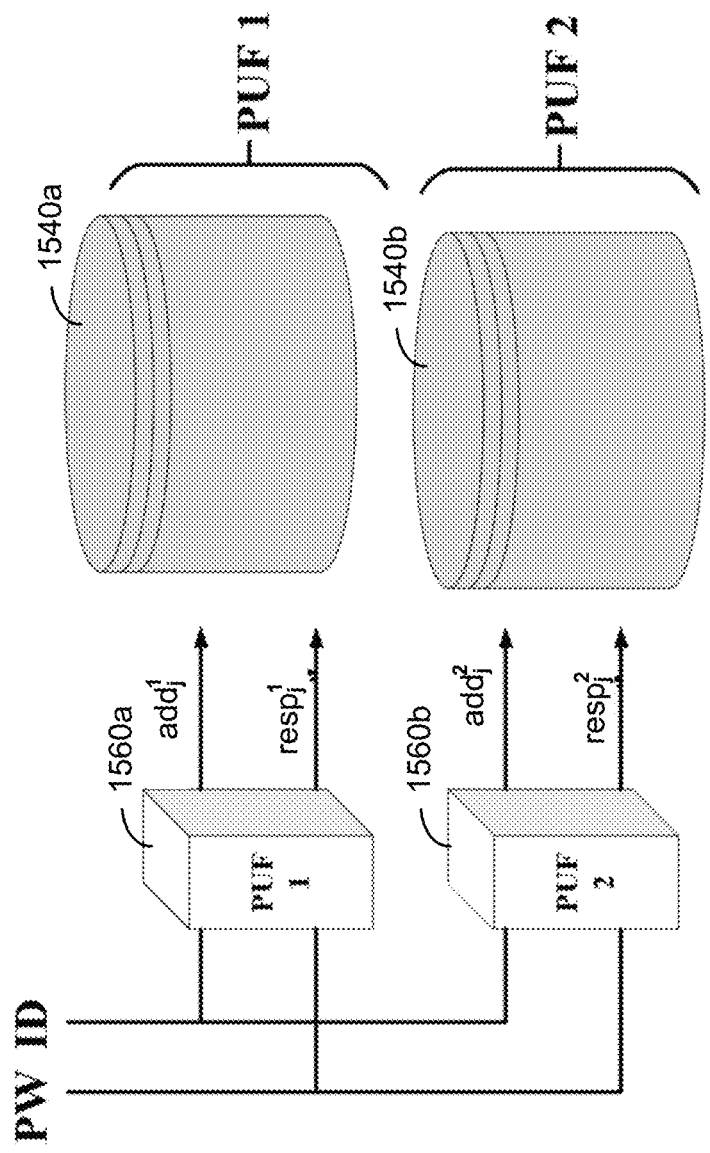
FIG. 15 depicts the use of a database derived from two PUFs as a back-up plan.

FIG. 15 illustrates steps of an example method in an embodiment using two distinct PUFs, each associated with a distinct database for redundancy. As shown in FIG. 15, the same user credential (a user identified and a password) is provided to two APGs $1560a, b$. Here, the challenge responses that are generated using each of the two PUFs are stored in a corresponding database $1540$ during registration. The user identifier and password may be used to produce one or more challenges. The responses to these challenges may be stored in the database $1540a, b$ corresponding to each APG $1560$. As an example, the embodiment shown in FIG. 11 may be modified to use the two APGs $1560a, b$ and the two databases $1540a, b$. As in embodiment $1100$ a first digest of a combination of the user identifier and password (e.g., the digest $1122a$) may be used as a first challenge to each APG $1560$ used to specify an address (e.g., the address $1132a$) and a digest of the password itself (e.g., the digest $1122b$) may be used as a second challenge to produce a challenge response to be stored at that address (e.g., the response $1132b$ stored at the address $1132a$ in the database $1140$). Thus, as shown in FIG. 15, the challenge responses $\{resp_j^1, resp_j^2\}$ stored at addresses $\{add_j^1, add_j^2\}$, respectively, in the databases $1540a, b$. The superscripts $\{1, 2\}$ indicate the first and second databases $1540a, b$ corresponding to the first and second APGs $1560a, b$ and the subscript j indicates $User_j$.

In some embodiments, the one APG (e.g., the APG $1560a$) and/or its associated PUF array is used as a primary source for authentication of any particular user and one or more APGs (e.g., the APG $1560b$ is used as backup for the APG $1560a$. In other embodiments, any APG may be used for any user in a load-balancing configuration as pictured in FIG. 14. For example, in the first arrangement, two databases are created during registration of a user's credential. During authentication, only the first database is used. If the result of authentication is positive, the second database does not need to be checked. The second database is only checked in exceptional cases when the first PUF stops working. In another embodiment, the two (or more) APGs are used randomly. In this case, each APG may be used for authentication, and on average each PUF will be used half of the time for authentication; if one of them fails, the other PUF can be used as a backup.

Figure 16A:
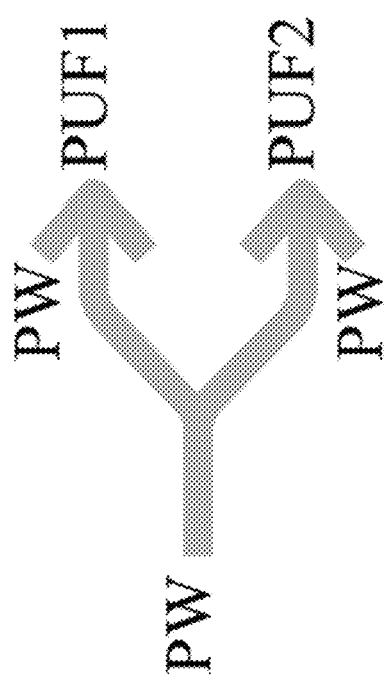
FIGS. 16A and 16B depict two methods of utilizing a password with at least two PUFs in a resilient architecture.
Figure 16B:
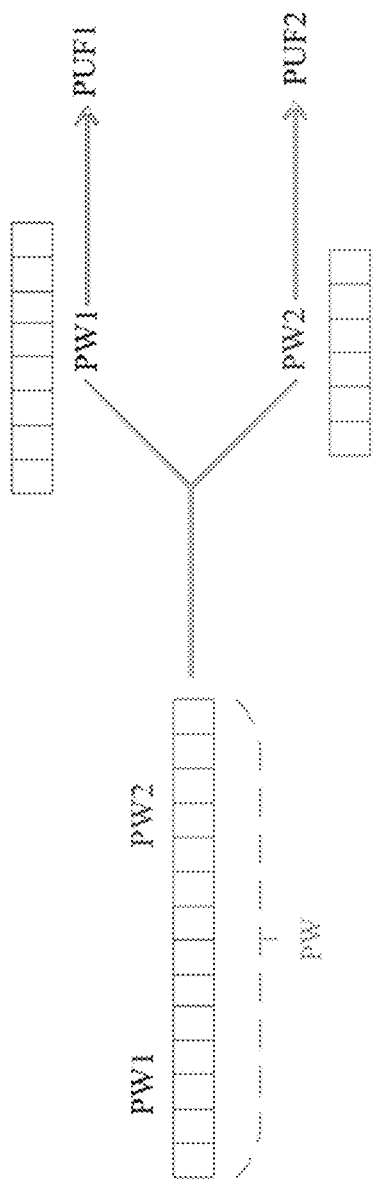

Different approaches may be used to incorporate user of a user password in embodiments with multiple APGs and/or PUF arrays. The example methods shown in FIG. 16A and FIG. 16B are transparent to users. As shown in FIG. 16A a user password is supplied by a server and used to access two distinct PUF arrays (e.g., via two APGs). In this method, the same user password is supplied to each PUF and the challenge response(s) for each user are stored in each database using any suitable method, including those described in connection with various methods (e.g., any of the methods described in connection with FIG. 6, 7, 11, or 12, and/or related methods).

In another example method, a user enters a password, and the server divides it into two password segments, labeled $PW_1$ and $PW_2$, as shown in FIG. 16B. The lengths of the two password segments, $PW_1$ and $PW_2$ can be increased using any suitable method, including padding. Then, $PW_1$ is used with the one APG/PUF, and $PW_2$ is used with another APG/PUF (i.e., a distinct password for each of one or more additional PUFs). As above, only one password need be supplied (and thus the use of multiple PUFs with distinct passwords may be transparent to a user). The server may generate and use each password segment as needed (e.g., if a particular APG/PUF fails or if load balancing requires the use of a particular PUF).

The example method of FIG. 16B may be modified to provide secure "backdoor" access to controlled resources accessed by authentication of a user. This secure backdoor may allow a trusted party (e.g., a system administrator) to access protected information without increasing the risk of the information being compromised by malicious third parties, As discussed previously, the password can be divided into two (or more) password segments or otherwise processed such that two or more unique message digests may be produced using the same password. For instance, the second password segment $PW_2$ can be used as the "backdoor" password.

Figure 20:
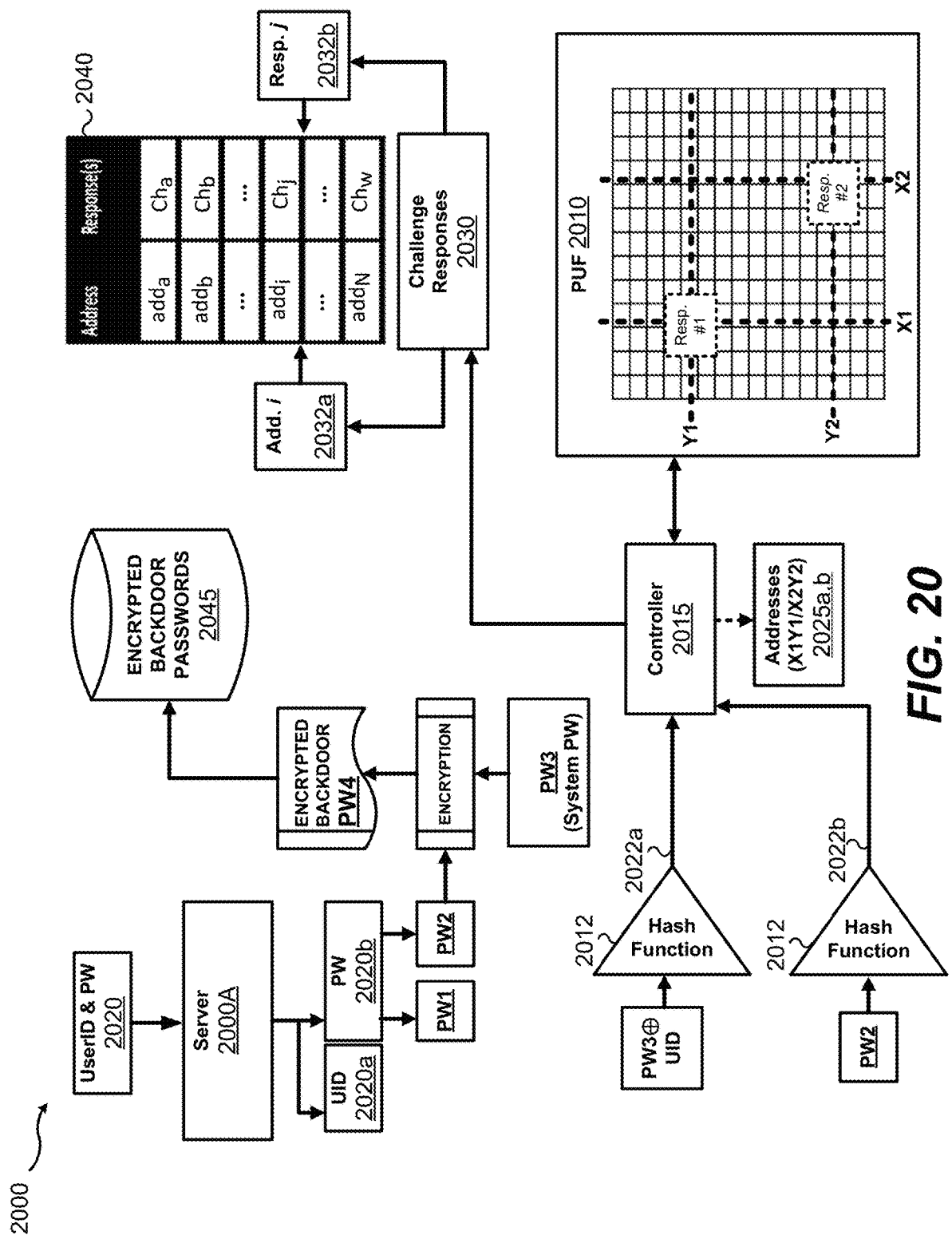
FIG. 20 depicts an embodiment providing secure backdoor access to a system administrator.
Figure 21:
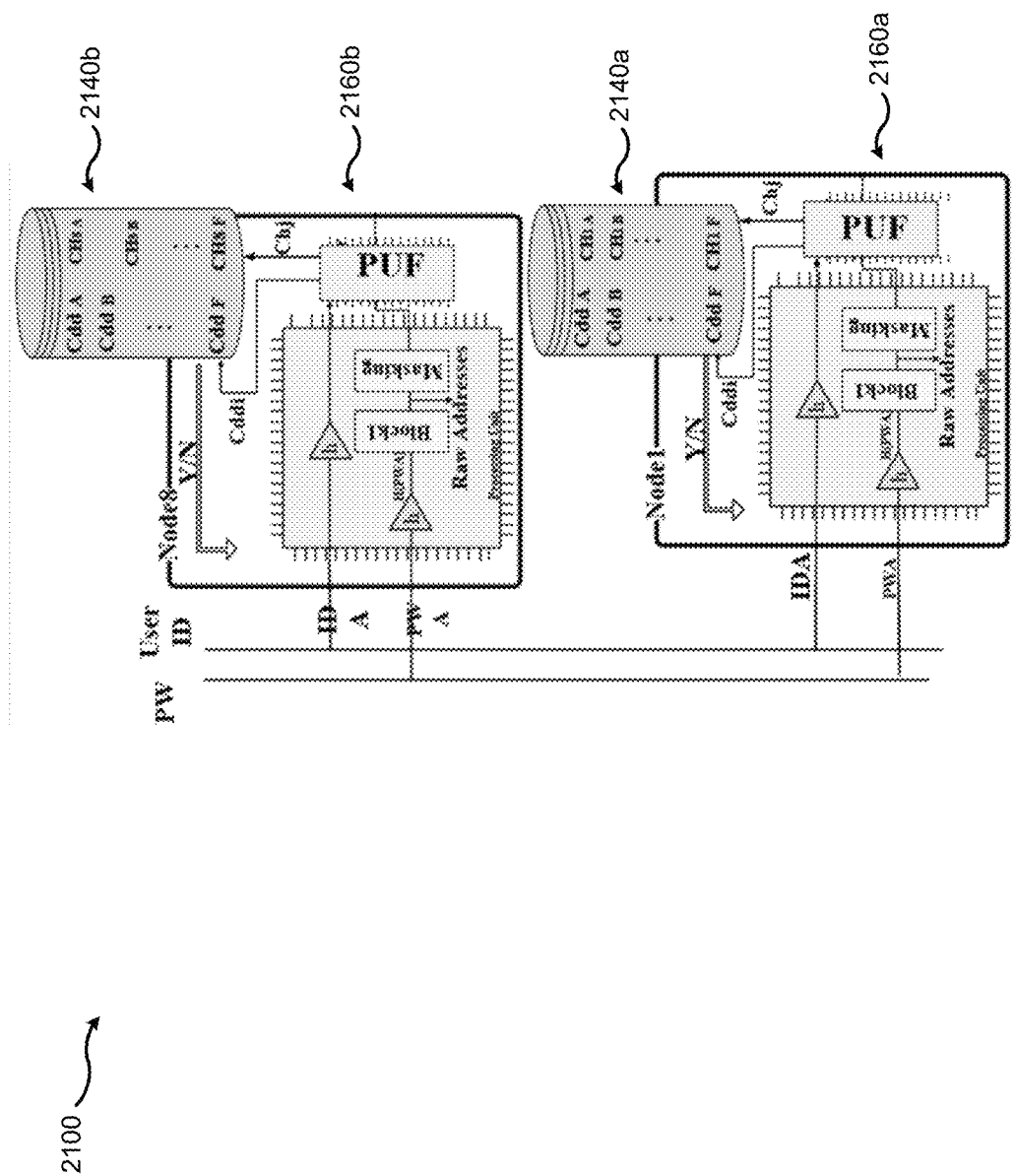
FIG. 21 depicts a schematic-level diagram of APG circuitry in a dual-APG embodiment.

FIG. 20 depicts an example embodiment $2000$ in which a trusted party with access to a server $2000A$ may perform backdoor authentication for a selected user. As shown, the server $2000A$ separates the password $2020b$ corresponding to a UserID $2020a$ into two segments ($PW_1$ and $PW_2$). $PW_1$ may be used for ordinary authentication transactions as described above, while $PW_2$ may be used for backdoor authentication of the selected user using the PUF array 2010. The PUF array 2010 may be the same PUF used for ordinary authentication or a different PUF array. For added security the backdoor password $PW_2$ may be encrypted by an additional password $PW_3$ (e.g., an administrator password) to produce an encrypted backdoor password $PW_4$ (e.g., $PW_4=PW_2 \oplus PW_3$). Challenge responses corresponding to the backdoor password $PW_2$ for each user may be generated as described previously (e.g., the backdoor password $PW_2$ may be hashed using a hash function 2012 to produce a message digest 2020$b$) which is used by a microcontroller 2015 to identify devices at an address 2025, or a range of addresses, in the PUF array 2010 to measure). The corresponding challenge responses 2032$b$ may be stored in a database 2040 (e.g., a database 240, 740, 1140). The address at which the challenge response 2032$b$ is stored may also be determined using a challenge response. For instance, as shown in FIG. 20, the password $PW_3$ may be combined with the UserID 2020$a$ to produce a message digest 2022$a$ for use as a challenge. The corresponding challenge response 2032$a$ may be used as the address ("add$_i$") at which the challenge response 2032$b$ ("resp$_j$") is stored in the database 2040. The server may store backdoor passwords in the datastore 2045. As shown, the backdoor password $PW_2$ for each user may be stored as the encrypted backdoor password $PW_4$ for the corresponding user in the datastore 2045. In this example, the datastore 2045 does not contain any UserIDs and is not indexed by UserID (e.g., the backdoor passwords may be ordered randomly).

To perform backdoor authentication, a trusted party attempts authentication of the selected user using a brute force approach. The trusted party tries all encrypted back door passwords in the datastore 2045. Each $PW_4$ value is decrypted (e.g., using the password $PW_3$) to generate a corresponding candidate password for $PW_2$. For each candidate value of $PW_2$ (one of which is the actual backdoor password for the selected user), the server 2000A may search an address in the database 2040 for a challenge response corresponding to the correct backdoor password $PW_2$ for the selected user. As above, the address may be determined based on a combination of the UserID 2020$a$ for the selected user with the additional password $PW_3$. This combination may be hashed using the has function 2012 and used to determine the address directly or, as shown, the combination the UserID 2020$a$ with the password $PW_3$ may be used to generate a challenge response 2032$a$ to be used as the address. In this example, if the datastore 2045 contains backdoor passwords for one million users and if each authentication attempt takes 10 ms, the backdoor authentication process will require at least 10 s for each backdoor user authentication performed. The length of this process may be increased by the addition of random entries in the datastore 2045 if it is desirable to make backdoor authentication more difficult.

FIG. 17 illustrates steps in an example registration process 1700 suitable for use with the configuration of APGs shown in FIG. 15. Two corresponding PUFs should be queried, and the initial response should be saved in the database corresponding to each APG (e.g., the databases 1540$a,b$ corresponding to the APGs 1560$a,b$ of FIG. 15).

FIG. 18 illustrates steps in an example authentication process 1800, in which a first Node (e.g., Node1 of FIG. 14) is a primary node with an APG that is used to authenticate a particular user. The same steps apply as done in the registration process and are repeated for the authentication. Newly-generated PUF responses generated by the APG of Node 1 are compared to the initial response stored in a database accessed by Node1.

FIG. 19 illustrates steps in an example authentication process 1900, in which a second Node (e.g., Node8 of FIG. 14) is used as a backup (or alternate node, in the case of load-balancing) to authenticate a particular user using a corresponding APG and database. The same steps apply as done in the registration process and are repeated for the authentication. Newly-generated PUF responses generated by the APG of Node 8 are compared to the initial response stored in a database accessed by Node 8 (e.g., the database 1540$b$ corresponding to the APG 1560$b$ in FIG. 15).

If a node or its APG fails, or if access is otherwise prevented, a router (e.g., the router of FIG. 14) may designate a new node with an APG and database to handle new registrations of users registered after failure of the primary node (e.g., Node 1 or any other node designated as primary for a particular user in the case of load balancing) (e.g., Node 11 of FIG. 14) in cooperation with other nodes (e.g., Node8). The registration and authentication of new users may be performed as described above in connection with various embodiments. In some examples, a new node (e.g., Node11) may permanently are temporarily assume all functions of a failed node (e.g., Node1).

FIG. 20 shows elements of an example embodiment 2000 control circuitry with two (or more) separate APGs 2060$a,b$ suitable for use with embodiments herein using multiple PUF arrays. Each APG 2060 is configured to receive a user credential (e.g., a user identifier and a password) and to hash portions of the credential as described above according to various embodiments (e.g., to produce the digests 1122$a,b$ as described in connection with FIG. 11). In some embodiments, the hashing function is implemented as an application-specific integrated circuit or a portion thereof. Each APG 2060 may be configured to measure characteristics of its PUF array during registration and to store those measurements in the corresponding database 2040 (i.e., the database 2040$a$ corresponding to the APG 2060$a$, or the database 2040$b$ corresponding to the APG 2060$b$). Each APG 2060 may also be configured to identify unreliable cells which should be excluded from use in generating challenge responses as described above in connection with FIG. 7, as one non-limiting example. Each APG 2060 may form part of a network node (e.g., one of the nodes shown in FIG. 14 such as Node1 or Node8) which is in turn configured to receive authentication requests via a router (e.g., the router shown in FIG. 14). Authentication may be performed according to methods described above by generating challenge responses corresponding to a password included in a user credential to be authenticated and comparing the challenge responses generated to those generated during the registration process and stored in a database 2040. In some embodiments, each APG 2060 is further configured to generate additional challenge responses in order to identify an address (e.g., an address 1132$a$) at which the appropriate registration information is stored, as described in connection with FIG. 11.

It should be understood that, unless explicitly stated or otherwise required, the features disclosed in embodiments explicitly described herein and elsewhere in this disclosure may be used in any suitable combinations and using various suitable parameters. Thus, as a non-limiting example, any method described herein or any other suitable method may be used to determine measurement parameters of for measuring the characteristics of PUF device. As a non-limiting example, challenge lengths, response lengths, numbers of devices identified by a challenge (and numbers of devices to be excluded or "masked"), digest lengths, the size of PUF arrays used, and other parameters may be varied as desired for different applications. It should also be understand that while particular PUF device technologies are discussed in the examples herein, they are intended as non-limiting examples of suitable PUF technologies.

The invention claimed is:

1. A method of authenticating users of a computer system, the method comprising causing processing circuitry of the computing system to execute an enrollment process comprising the steps of:
receiving user credentials;
generating a first challenge message on the basis of the user credentials, the first challenge message identifying devices in a first array of physical unclonable function devices (a first PUF array), measuring physical parameters of the identified devices in the first PUF array, resulting in a first enrollment challenge response; and storing the first enrollment challenge response in a first addressable database at a first address determined at least in part by the user credentials;
generating a second challenge message on the basis of the user credentials, the second challenge message identifying devices in a second array of physical unclonable function devices (a second PUF array), measuring physical parameters of the identified devices in the second PUF array, resulting in a second enrollment challenge response; and storing the second enrollment challenge response in a second addressable database at a second address determined at least in part by the user credentials;
wherein the first and the second array PUF arrays are independent such that the failure of one PUF array does not prevent the computer system measuring devices in the other PUF array.

2. The method of claim 1, wherein the first and second databases comprise different sets of memory locations within the same database.

3. The method of claim 1, wherein the user credentials comprise a password, and wherein the identification of devices in the first and second PUF arrays is done on the basis of the password.

4. The method of claim 3, wherein the identification of devices in the first PUF is done on the basis of a first portion of the password, and the identification of devices in the second PUF is done on the basis of a second portion of the password.

5. The method of claim 3, wherein the user credentials comprise a user identifier, and wherein the first and second addresses are determined on the basis of the user identifier and the password.

6. The method of claim 1, wherein the user credentials comprise a user identifier and a password, and wherein the first or second address is determined according to a method comprising:
generating an address challenge message on the basis of the user identifier and password, the address challenge message identifying a plurality of devices of a PUF array;
measuring physical parameters of the identified devices in the PUF array;
determining an address on the basis of the measured physical parameters.

7. The method of claim 1, further comprising causing processing circuitry of the computing system to execute an authentication process comprising the steps of:
receiving user credentials comprising a user identifier and a password;
selecting one of the first or second PUF array;
generating an authentication challenge message on the basis of the received password, the authentication challenge message identifying devices in the selected PUF array, measuring physical parameters of the identified devices in the selected PUF array, resulting in an authentication challenge response;
comparing the authentication challenge response to the enrollment challenge response corresponding to the selected PUF array.

8. The method of claim 7, wherein selecting one of the first or second PUF array comprises determining whether the first or second PUF array is in a failure condition and selecting the PUF array not in a failure condition.

9. The method of claim 8, wherein selecting one of the first or second PUF array comprises determining which of the first or second PUF array is experiencing a higher usage load, and selecting the PUF array with the smaller usage load.

10. The method of claim 7, wherein comparing the authentication challenge response to the enrollment challenge response corresponding to the selected PUF array comprises generating, from the user identifier and password, a set of addresses in the addressable database corresponding to the selected PUF array and reading the enrollment challenge from that addressable database.

11. The method of claim 1, wherein the first and second PUF array each comprise separate arrays of devices within the same physical device.

12. A method of providing authentication and securely storing authentication data in a computing system provided with two or more arrays of physical unclonable function devices (PUF arrays), the method comprising causing processing circuitry of the computing system to:
receive user credentials, each user credential including a user identifier and a password associated with the user identifier;
generate challenge messages, each challenge message corresponding to a respective user credential;
generate and store initial challenge responses associated with the first PUF array by measuring physical parameters of PUF devices belonging to portions of the first PUF array identified by a first subset of the challenge messages;
generate and store initial challenge responses associated with the second PUF array by measuring physical parameters of PUF devices belonging to portions of the second PUF array identified by a second subset of the challenge messages;
perform a first authentication by:
receiving a first user credential associated with a first user;
generating a first challenge message corresponding to the first user credential;
generating a first challenge response by measuring physical parameters of PUF devices belonging to a portion of the first PUF array identified by the first challenge message; and
comparing the first challenge response to an initial challenge response corresponding to the first user credential;
and
perform a second authentication by:
receiving a second user credential associated with a second user;

generating a second challenge message corresponding to the second user credential;

generating a second challenge response by measuring physical parameters of PUF devices belonging to a portion of the second PUF array identified by the second challenge message; and comparing the second challenge response to an initial challenge response corresponding to the second user credential.

* * * * *